United States Patent
Golan et al.

(10) Patent No.: US 8,015,287 B2
(45) Date of Patent: *Sep. 6, 2011

(54) REDUCING CONFIGURATION ERRORS FOR MANAGED SERVICES IN COMPUTER NETWORKS

(75) Inventors: Joseph Golan, Ocean, NJ (US); Joseph Thomas O'Neil, Staten Island, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 344 days.

This patent is subject to a terminal disclaimer.

(21) Appl. No.: 12/025,650

(22) Filed: Feb. 4, 2008

(65) Prior Publication Data

US 2008/0127316 A1   May 29, 2008

Related U.S. Application Data

(63) Continuation of application No. 10/382,037, filed on Mar. 5, 2003, now Pat. No. 7,340,519.

(51) Int. Cl.
*G06F 15/173* (2006.01)
(52) U.S. Cl. ........ 709/225; 709/218; 709/227; 709/229; 726/15
(58) Field of Classification Search .................. 709/225, 709/227–229, 218; 726/3–6, 15, 28
See application file for complete search history.

(56) References Cited

U.S. PATENT DOCUMENTS

| | | | |
|---|---|---|---|
| 6,339,595 | B1 | 1/2002 | Rekhter et al. |
| 7,340,519 | B1 | 3/2008 | Golan et al. |
| 2001/0051876 | A1 | 12/2001 | Seigel et al. |
| 2002/0186664 | A1* | 12/2002 | Gibson et al. ................. 370/254 |
| 2004/0006708 | A1* | 1/2004 | Mukherjee et al. ........... 713/201 |

OTHER PUBLICATIONS

Bonika et al., CE-to-CE Authentication for Layer 3 VPN's, Aug. 2002, IEFT, 6 pages.*

* cited by examiner

*Primary Examiner* — Douglas B Blair
*Assistant Examiner* — Oleg Survillo

(57) ABSTRACT

A method of configuring a network element such that a Virtual Private Network (VPN) site can connect to the network element is disclosed. An interface on a Provider Edge (PE) router is configured in restricted mode. A request is received from the interface to authenticate a user associated with a VPN requesting to connect to the interface. A determination is made as to whether the user is authorized to submit requests to the interface. If the user is authorized, an activation request is received from the interface to allow the VPN can connect to the interface. A determination is made as to whether the user is authorized to connect to the interface via the VPN. If the user is authorized, VPN site parameters are configured at the PE router and the PE router is configured in unrestricted mode.

29 Claims, 26 Drawing Sheets

FIG. 2

```
201 — ip vrf VPNA
202 — rd 1:1
203 — route-target export 1:1
204 — route-target import 1:1

205 — interface serial0/1
206 — description access link to VPN Site A1
207 — ip vrf forwarding VPNA
208 — ip address 10.1.1.1 255.255.255.252

209 — router bgp 100
210 — ...
211 — address-family ipv4 vrf VPNA
212 — ...
```

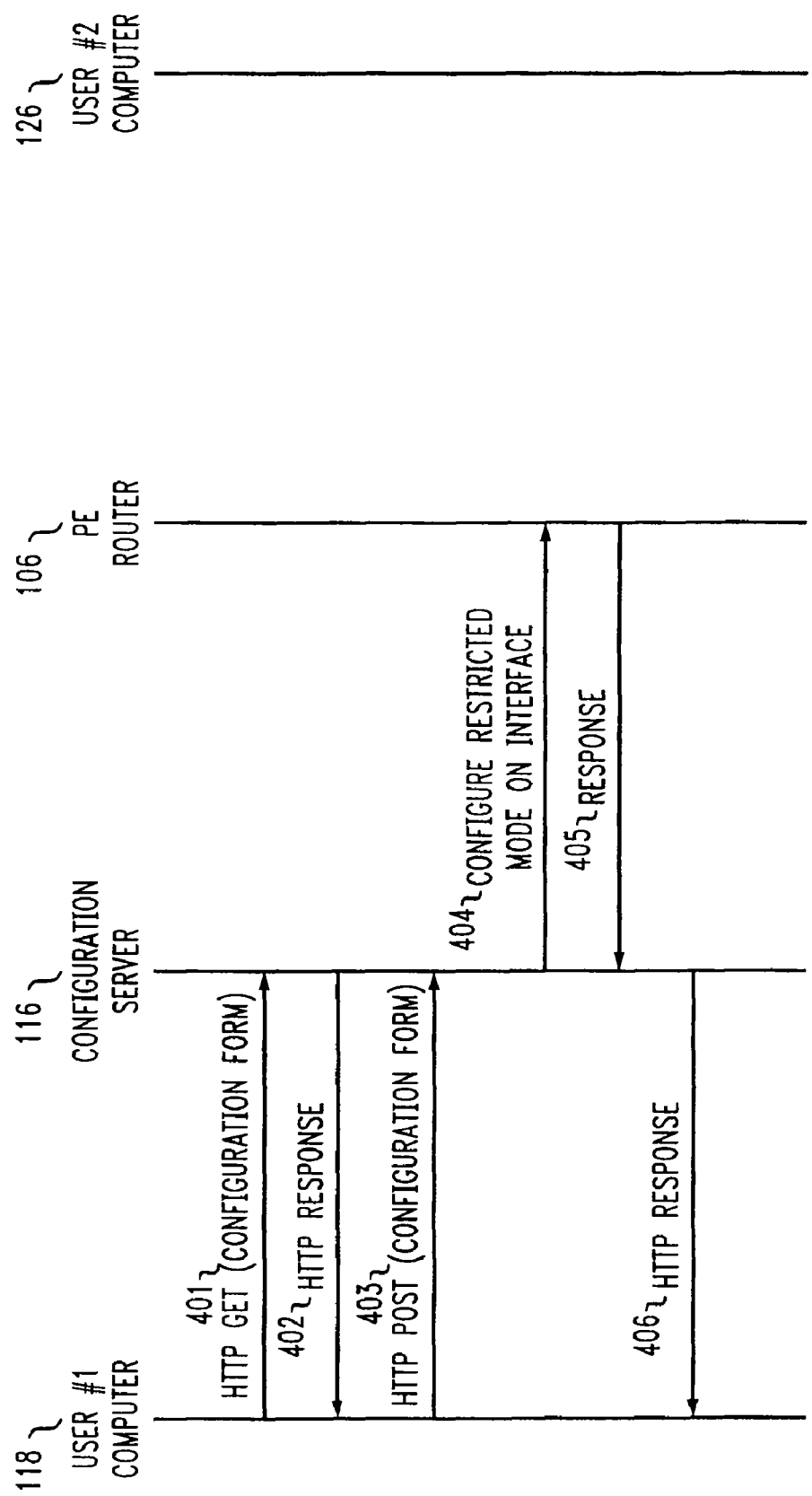

FIG. 5

VPN SITE AUTHENTICATION REQUEST

USER NAME [　　　　　　　] ~504
USER PASSWORD [　　　　　　　] ~506

[ SUBMIT ] ~508

FIG. 6

VPN SITE AUTHENTICATION REQUEST

VPN NAME [　　　　　　　] ~604
PE ROUTER INTERFACE ADDRESS [　　　　　　　] ~606

[ SUBMIT ] ~608

FIG. 7

```
701 — interface serial10/1
702 — description restricted interface (Configuration Server at 10.1.1.3)
703 — restricted 10.1.1.3
```

FIG. 9

| ROUTER LOOPBACK ADDRESS | ROUTER INTERFACE | USERS | CONFIGLET |
|---|---|---|---|
| 10.1.1.5 | ETHERNET0/1 | JOHN CAMIOLO | /configlets/configlet1 |
| 10.1.1.5 | ETHERNET0/2 | ED BONACCI | /configlets/configlet2 |
| 10.1.1.5 | ETHERNET0/3 | JANE SMITH, ANN TAYLOR | /configlets/configlet3 |
| | | | |

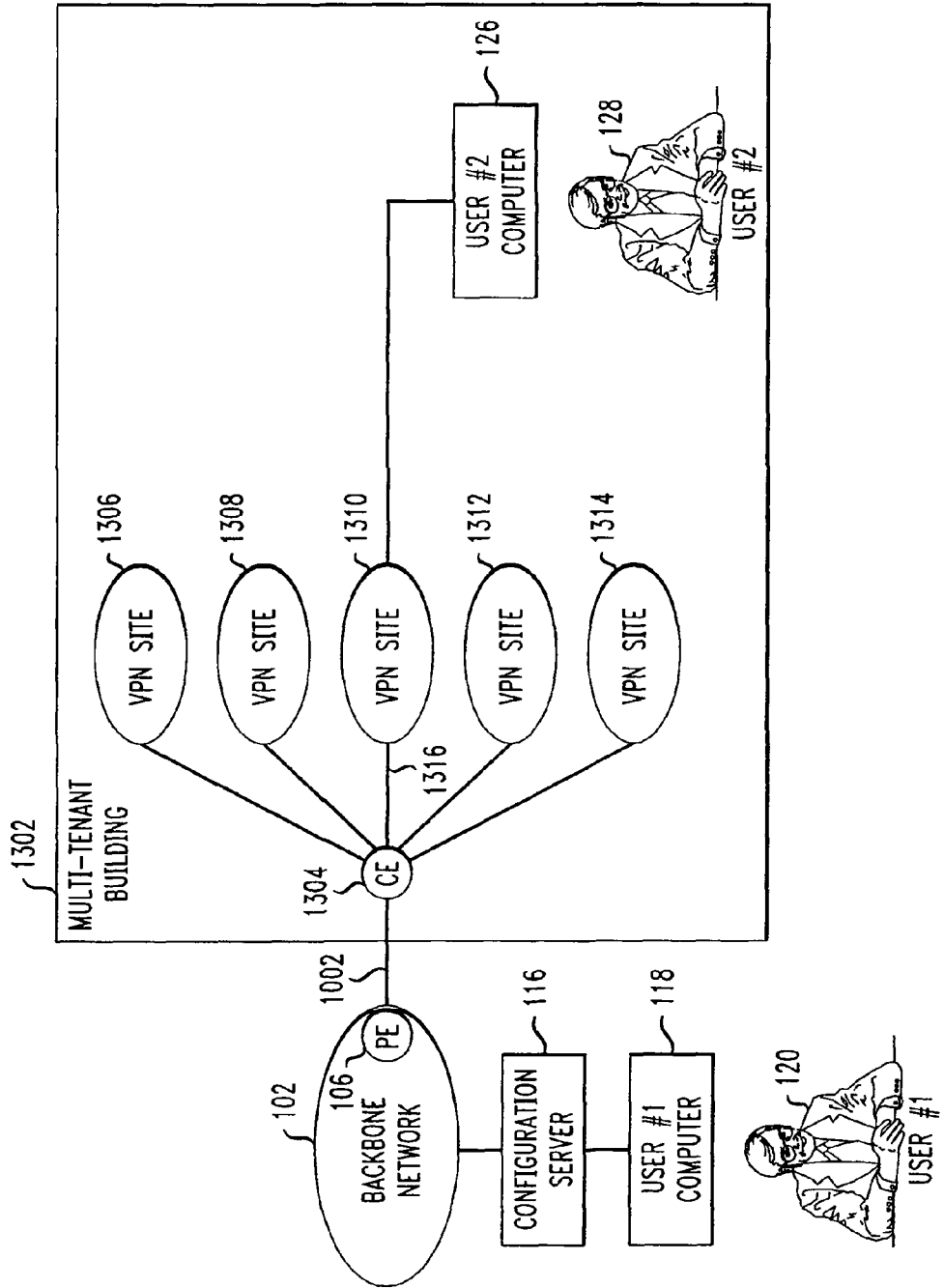

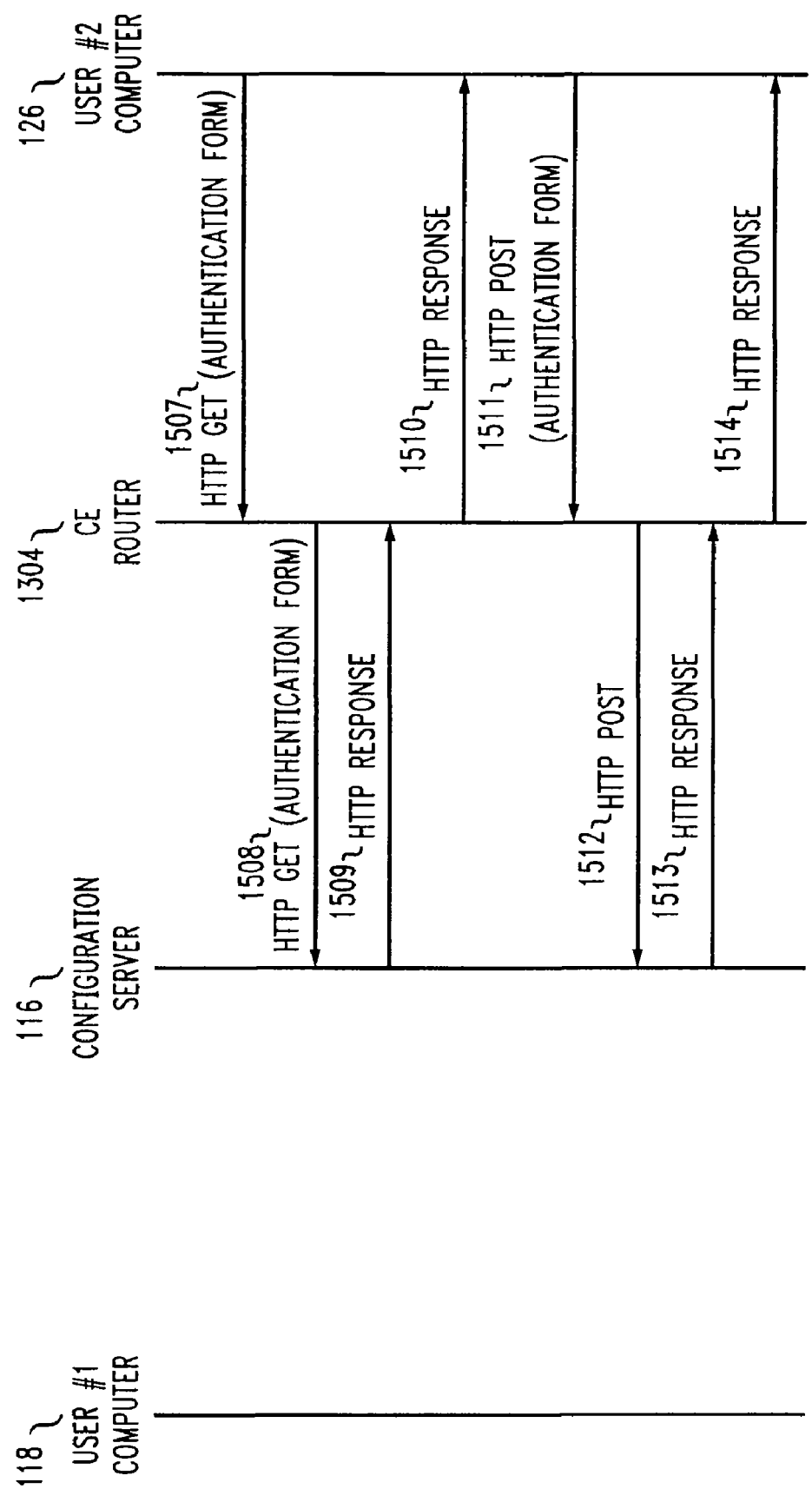

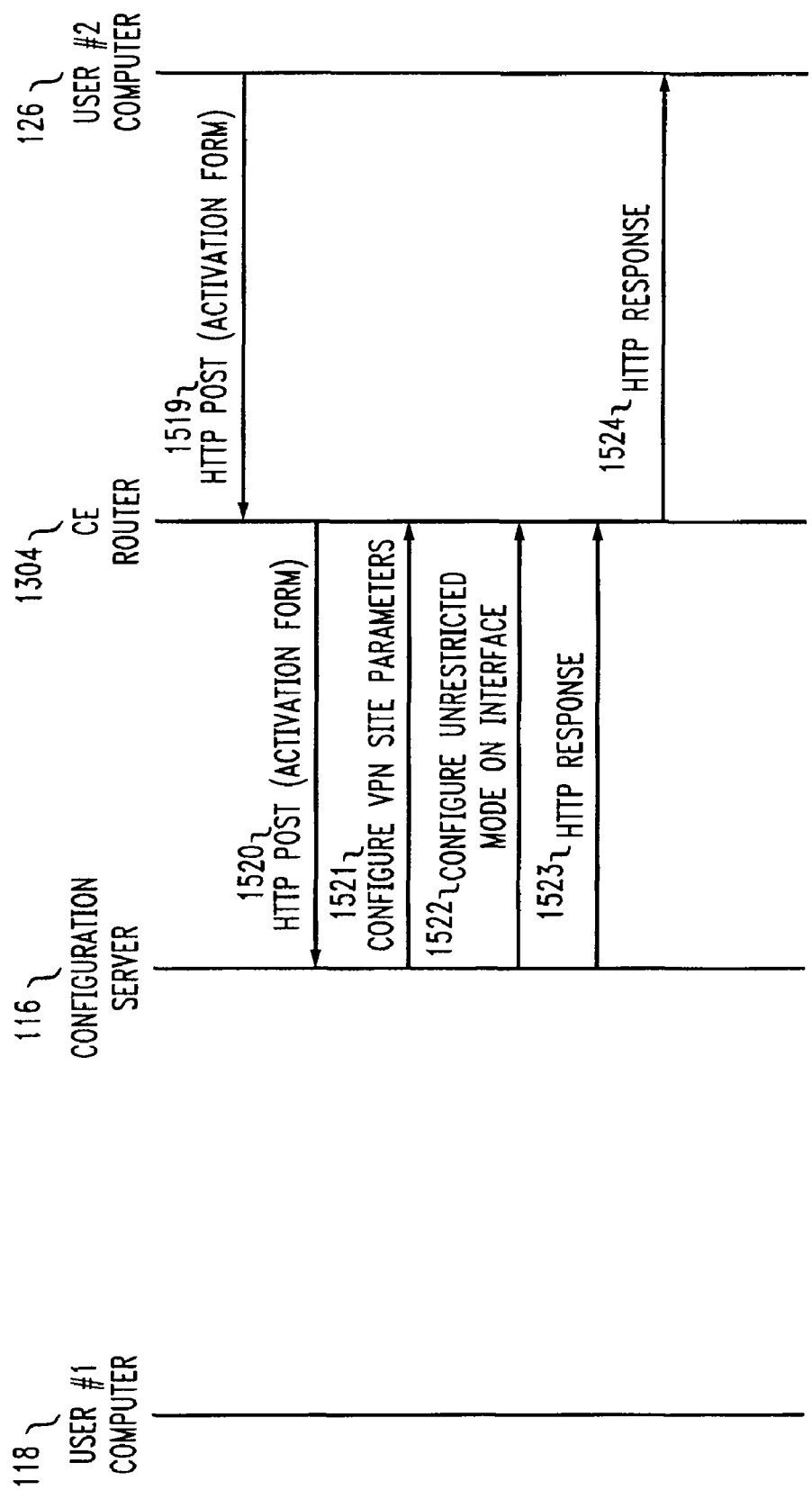

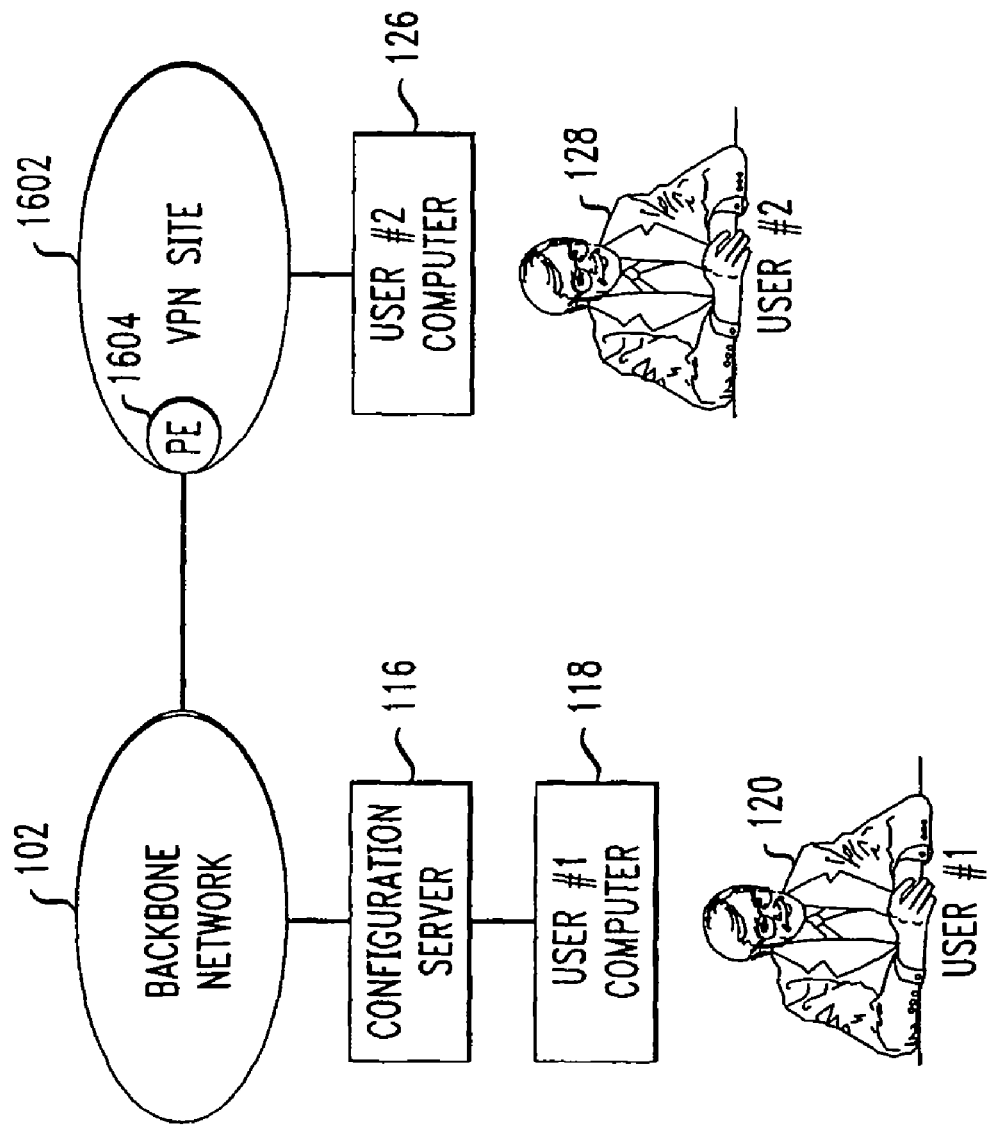

REDUCING CONFIGURATION ERRORS FOR MANAGED SERVICES IN COMPUTER NETWORKS

CROSS-REFERENCE TO RELATED APPLICATIONS

This application is a continuation of U.S. patent application Ser. No. 10/382,037 filed Mar. 5, 2003, entitled, "REDUCING CONFIGURATION ERRORS FOR MANAGED SERVICES IN COMPUTER NETWORKS", now U.S. Pat. No. 7,340,519 B1. The aforementioned related patent application is herein incorporated by reference.

FIELD OF THE INVENTION

The present invention relates to configuring managed services in computer networks.

BACKGROUND OF THE INVENTION

The current art provides computer networks that offer different types of communication services. One example of a service is a virtual private network (VPN). A VPN consists of multiple sites that are connected by a backbone network. The backbone is a shared infrastructure. It provides connectivity for sites that belong to different customers and VPNs.

Configuring a VPN is a complex task. The service is implemented by hardware and software elements that are distributed among multiple customer and provider locations. Each element must be correctly configured in order to meet customer requirements. Many customers select a service provider to manage their VPN. The provider is responsible for configuring the different elements that implement the service.

The current art provides systems that assist with the task of configuring a VPN. These products provide graphical user interfaces that allow a provider to specify how VPN sites should be connected. Unfortunately, it is easy to make a mistake. A provider can incorrectly connect two VPN sites that belong to different customers. These customers may be competitors. The result can have serious consequences for the provider. These can include adverse publicity and litigation.

The current art provides other types of managed services on computer networks. For example, customers can select a provider to configure firewalls, servers, or other elements on their premises. This is done because the task of configuring these elements is complex. Similar possibilities for configuration errors also exist with these managed elements. Therefore, some technique is needed to minimize the probability of serious errors. A provider that uses such a technique will have a significant competitive advantage.

SUMMARY OF THE INVENTION

The process for configuring virtual private networks (VPNs) is complex. Hardware and software elements are distributed among multiple customer and provider locations. It is easy to make a mistake that can have serious consequences. For example, a provider can incorrectly connect two VPN sites that belong to different customers.

This invention reduces some types of serious configuration errors. Assume a new VPN site must be connected to a backbone network. The sequence of events is: (1) A Configuration Server (CS) configures the access interface of the provider edge (PE) router for restricted mode. (2) The customer connects to the VPN site. (3) The customer transmits authentication and activation requests to the restricted interface of the PE router. (4) The PE router forwards these requests to the CS. (5) The CS evaluates the requests. (6) The CS configures the PE router to connect the site to the VPN. (7) The CS configures the access interface of the PE router for unrestricted mode.

The CS does not configure a PE router to connect a site to a VPN until correct authentication and activation requests are received from the site. These requests provide additional checks to prevent serious configuration errors. This invention can also be applied to other types of managed services such as firewalls.

BRIEF DESCRIPTION OF THE DRAWINGS

The above-summarized invention will be more fully understood upon consideration of the following detailed description and the attached drawings wherein:

FIG. 2 shows an excerpt of PE router configuration.

FIG. 4A-4D show a message sequence diagram for the system.

FIG. 5 shows a Web page for submitting an authentication request.

FIG. 6 shows a Web page for submitting an activation request.

FIG. 7 shows a possible way to configure a router interface for restricted mode.

FIG. 9 shows the format of the Interface Database on the Configuration Server.

FIG. 13 shows the system architecture for Multi-VRF CE.

FIG. 15A-15D show a message sequence diagram for the system.

FIG. 16 shows the system architecture for an IPSEC VPN.

DETAILED DESCRIPTION

The present invention can be applied when provisioning several types of managed services in computer networks. The detailed description examines: (1) Border Gateway Protocol (BGP)/MultiProtocol Label Switching (MPLS) virtual private networks, (2) Multi-VPN Routing and Forwarding (VRF) Customer Edge (CE) virtual private networks, (3) IPSEC virtual private networks, and (4) firewalls. It is to be understood by those skilled in the art that the present invention may be used with other types of computer networks not specifically described herein.

BGP/MPLS Virtual Private Networks

Figure 1:
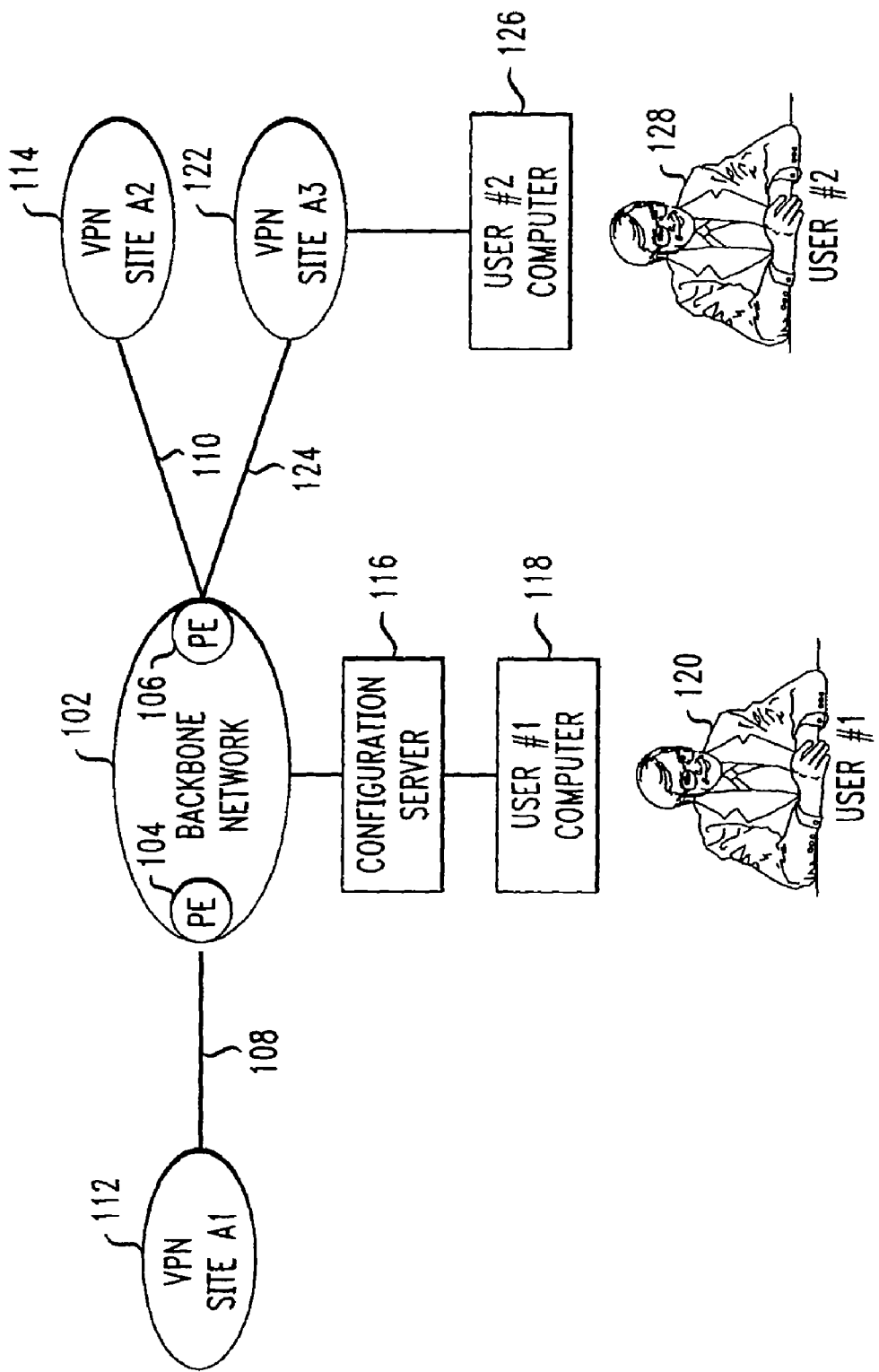
FIG. 1 shows the system architecture for a BGP/MPLS VPN.

FIG. 1 shows the system architecture for a BGP/MPLS virtual private network (VPN). Backbone network 102 is a shared infrastructure that connects VPN sites belonging to different customers. The network contains provider edge (PE) routers 104-106. These routers terminate access links to VPN sites. PE router 104 connects to VPN Site A1 112 via interface 108. PE router 106 connects to VPN Site A2 114 via interface 110 and to VPN Site A3 122 via interface 124. Assume that sites A1 and A2 are already operating in VPN A. Site A3 is a new site that must be included in VPN A.

Backbone network 102 is a packet switching network. It uses the Border Gateway Protocol (BGP) and Multi-Protocol Label Switching (MPLS) technologies to connect VPN sites. At the link layer, Asynchronous Transfer Mode (ATM) and/or frame relay can be utilized. Electrical and/or optical switching and transmission equipment can be incorporated into the backbone network User #1 120 interacts with User #1 Computer 118 via a command line, speech, or Web interface. The user enters parameters for the VPNs that are to be supported by the backbone network 102. Computer 118 transmits requests to Configuration Server 116. The server transmits configuration commands to the PE routers 104-106. These commands define the connectivity among VPN sites.

Configuration Server 116 is available from several vendors in the current art. These include Cisco Systems, Inc., Meta-Solv Software, Inc., Atreus Systems, Inc., Syndesis, and others Examples of the particular products which can be used include Cisco VPN Solution Center (VPNSC), MetaSolv Automated Service Activation Program (ASAP), Atreus xAuthority, and the Syndesis products, NetProvision and NetDiscover.

Configuration Server 116 configures access interface 124 of PE router 106 in restricted mode. This means that the interface only processes HyperText Transfer Protocol (HTTP) requests and HTTP responses to/from Configuration Server 116. Other traffic is blocked.

User #2 128 interacts with User #2 Computer 126 via a command line, speech, or Web interface. Computer 126 connects to VPN Site A3 122. The site connects to interface 124 of PE router 106. The user submits authentication and activation requests to computer 126. These requests are transmitted to PE router 106. The router forwards these requests to Configuration Server 116.

Configuration Server 116 evaluates these requests. If the requests are approved, the server transmits configuration commands to the router. These commands configure the router so VPN Site A3 122 is included in VPN A. Interface 124 of PE router 106 is placed in unrestricted mode. An acknowledgement is transmitted from PE router 106 to User #2 Computer 126. Feedback is then presented to User #2 128.

FIG. 2 shows an excerpt of an exemplary configuration from a PE router. The particular format shown is that used on Cisco routers such as the Cisco 2621 router. However, it is to be understood by those skilled in the art that the concepts are applicable to equipment from other vendors.

Lines 201-204 define a VPN Route and Forwarding (VRF) table. Line 201 specifies the name of the VRF table as VPNA. Line 202 specifies a route distinguisher value. Lines 203-204 specify route target values that are to be exported and imported for this VRF Table. VRF Tables, route distinguishers, and route targets are essential for BGP/MPLS VPNs. A complete discussion of this topic is available in MPLS and VPN Architectures, by Pepelnjak and Guichard, Cisco Press, 2001. It is important to understand that the statements in the VRF table definition define the connectivity among sites connected to the backbone network 102. Mistakes in this configuration cause incorrect connectivity and can have serious consequences.

Lines 205-208 show the configuration associated with an access interface. (For example, this can be interface 108 on PE router 104.) Line 206 is a comment. Line 207 associates the VRF table named VPNA with this interface. Line 208 assigns a network address with the interface.

Lines 209-212 show parameters associated with the BGP process that executes on the router. Line 209 specifies that the BGP process operate with autonomous system number equal to 100. Line 210 represents other statements associated with the process. Line 211 defines an address family for the VRF named VPNA. There will be a separate address family for each VRF that uses BGP to exchange routing information between autonomous systems. Line 212 represents other statements associated with the address family.

Figure 3A:
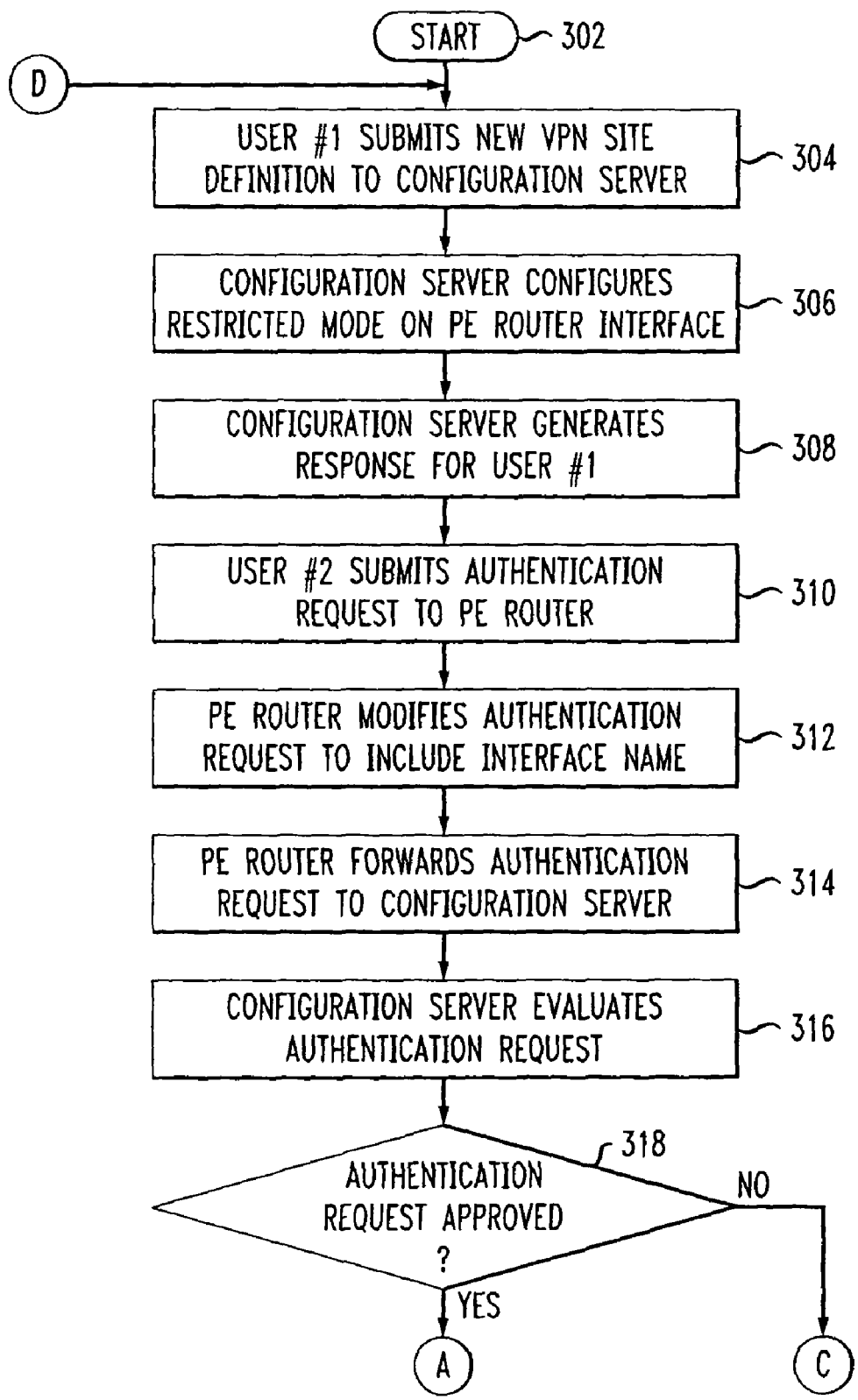
FIG. 3A-3C show flowcharts that depict steps for provisioning the system of FIG. 1.
Figure 3B:
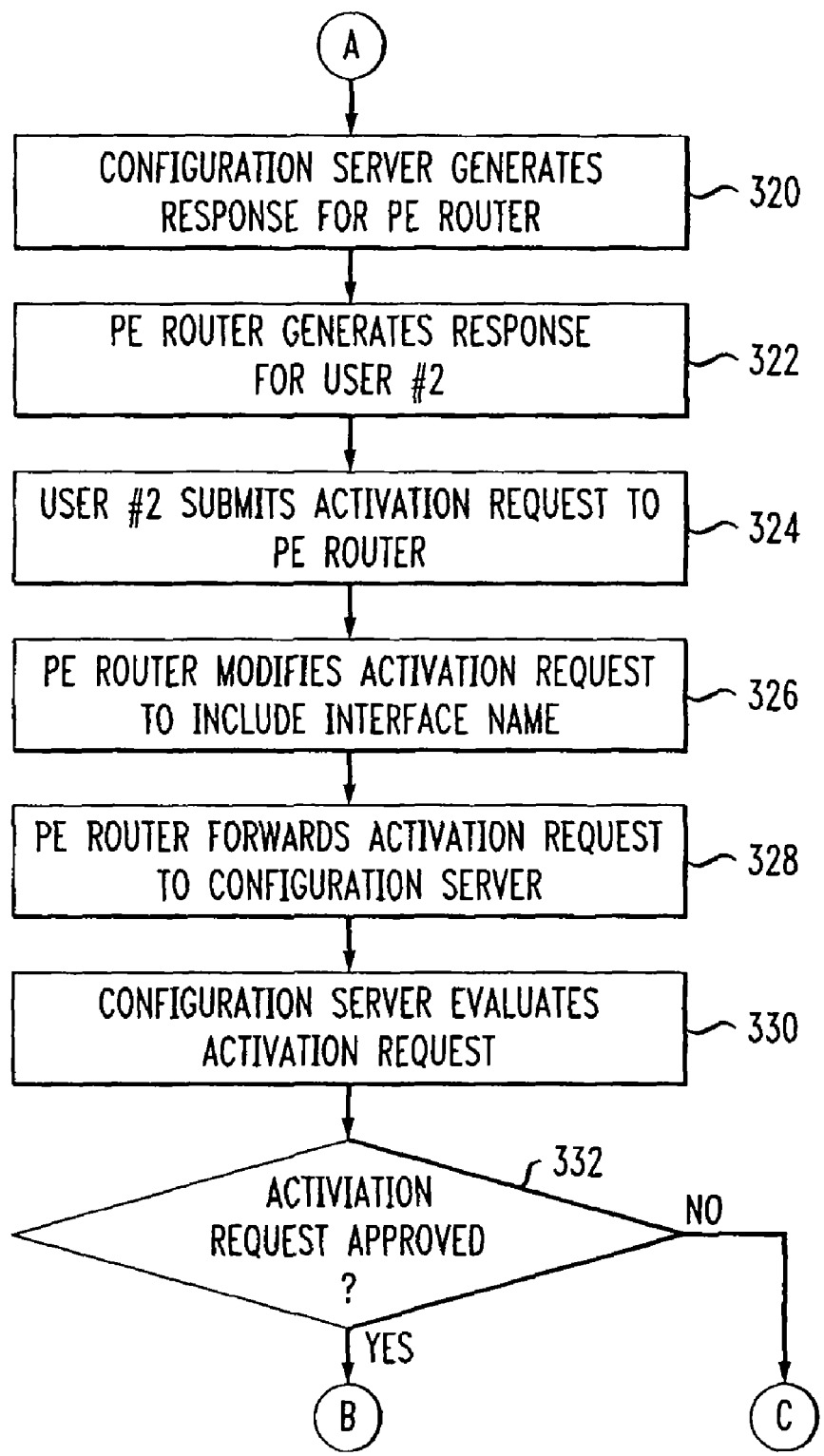
Figure 3C:
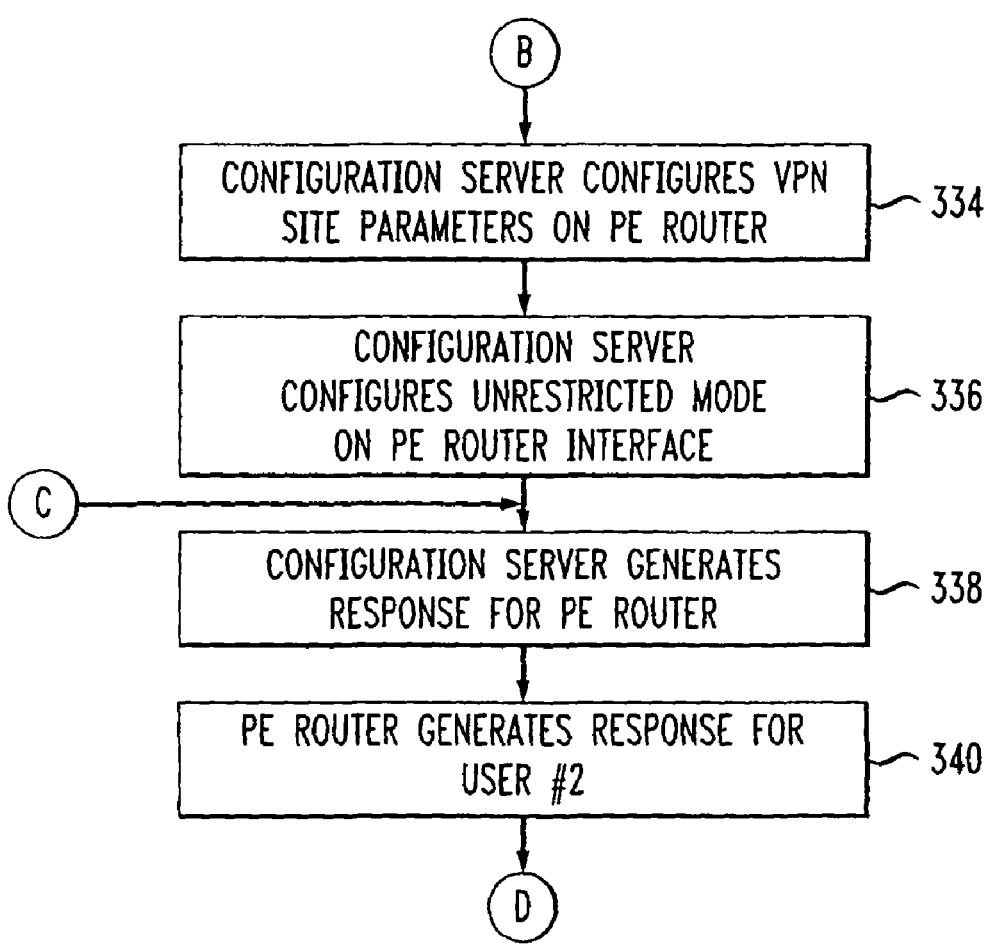

FIGS. 3A-3C show flowcharts that depict the steps for provisioning the system of FIG. 1. Execution starts at step 302. User #1 120 submits a configuration request to Configuration Server 116 at step 304. The server 116 configures interface 124 on PE router 106 in restricted mode at step 306. The server 116 generates a response for User #1 120 at step 308. The response indicates that the submission was successfully processed.

User #2 128 submits an authentication request to interface 124 of PE router 106 at step 310. The router 106 modifies this request to include the name of interface 124 at step 312. The request is forwarded to Configuration Server 116 at step 314. The server 116 evaluates the request at step 316. Specifically, the server 116 determines if User #2 128 is one of the individuals who is authorized to submit requests on PE router interface 124 at step 318. If no, the server 116 responds to PE router 106 with an error message at step 338. The router 106 generates a response for User #2 128 at step 340. Execution continues at step 304. If yes, the server 116 generates a response for the router 106 at step 320. The router 106 forwards the response to User #2 128 at step 322.

User #2 128 submits an activation request to interface 124 of PE router 106 at step 324. The router 106 modifies this request to include the name of interface 124 at step 326. The request is forwarded to Configuration Server 116 at step 328. The server 116 evaluates the request at step 330. Specifically, the server 116 determines if User #2 128 is one of the individuals who is authorized to submit requests on PE router interface 124 at step 332. If no, the server 116 responds to PE router 106 with an error message at step 338. The router 106 generates a response for User #2 128 at step 340. Execution continues at step 304. If yes, the server 116 configures the VPN site parameters on the router 106 at step 334. The server 116 configures unrestricted mode on interface 124 of PE router 106 at step 336. The server 116 generates a response for the router 106 at step 338. The router 106 forwards the response to User #2 128 at step 340. Execution continues at step 304.

FIGS. 4A-4D show a message sequence diagram for the system. A sequence of HTTP requests and responses is typically exchanged between Configuration Server 116 and User #1 Computer 118 to configure VPN parameters. FIGS. 4A-4D show only one exchange for simplicity.

Referring for FIG. 4A, message 401 is an HTTP Get request from User #1 Computer 118 to Configuration Server 116. This request is for a Web page to enter configuration data for a VPN site. Message 402 is the HTTP response to this request. Message 403 is an HTTP Post request from User #1 120 to Configuration Server 116. This request contains the configuration data for a VPN site. Configuration Server 116 evaluates this configuration request. It stores the VPN site parameters in a local database (not shown) and then transmits message 404 to PE router 106. Message 404 configures interface 124 on PE router 106 in restricted mode. Message 405 is the response from the router 106 to the server 116. Message 406 is the HTTP response to the HTTP Post in message 403.

Figure 4B:
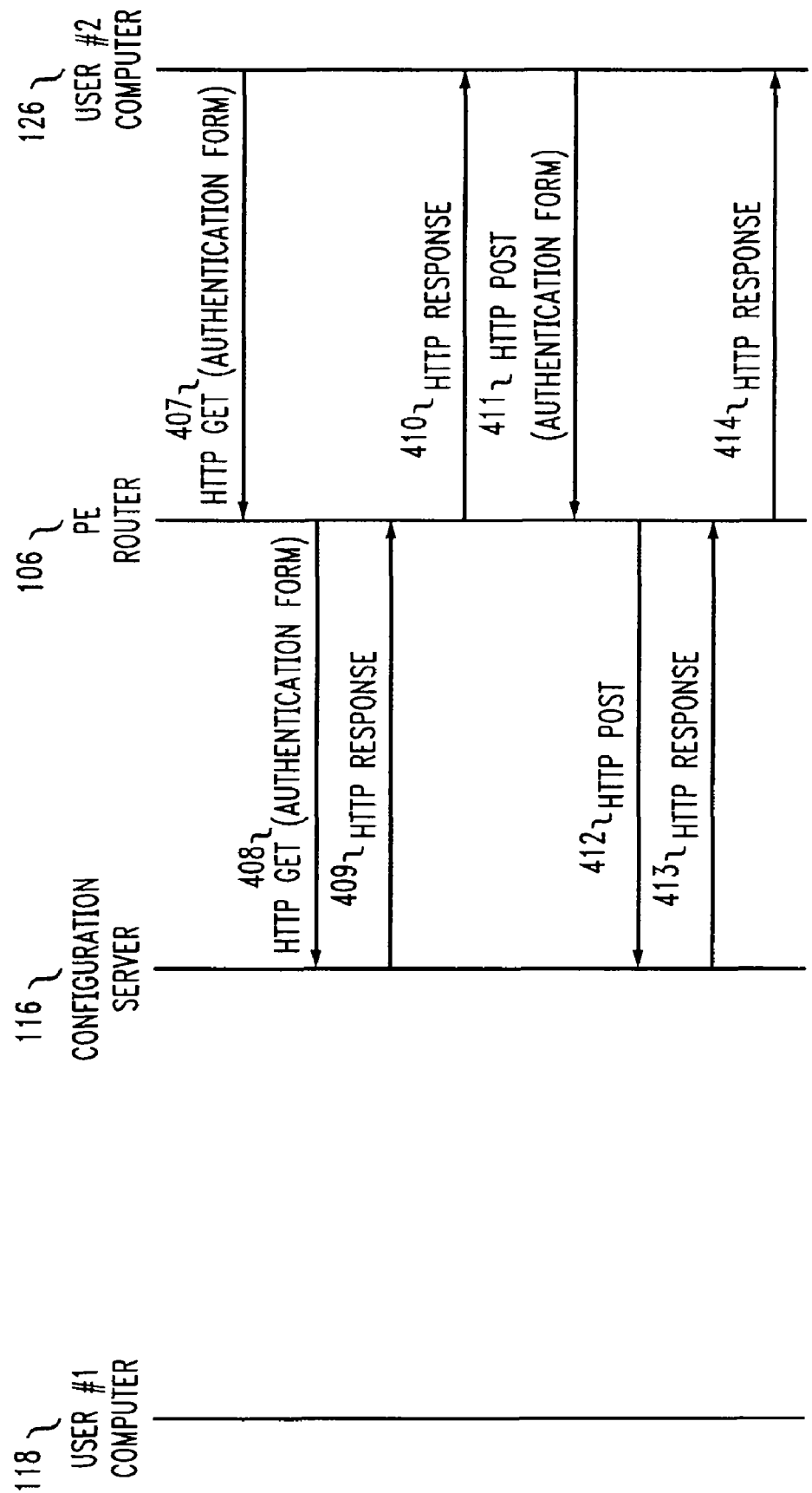

Referring to FIG. 4B, message 407 is an HTTP Get request from User #2 Computer 126 to PE router 106. This request is for a Web page to enter authentication data for User #2 128. The router 106 forwards this request to Configuration Server 116 as message 408. Message 409 is the HTTP response to the router 106. The router 106 forwards this HTTP response to User #2 Computer 126 as message 410.

Message 411 is an HTTP Post request from User #2 Computer 126 to PE router 106. This request contains the authentication data provided by User #2 128. This data can include a login and password. It may also include biometric information (e.g. fingerprint, retinal, speech, handwriting). The router 106 forwards this HTTP request to Configuration Server 116 as message 412. Message 413 is the HTTP response to the router 106. The router 106 forwards this HTTP response to User #2 Computer 126 as message 414.

Figure 4C:
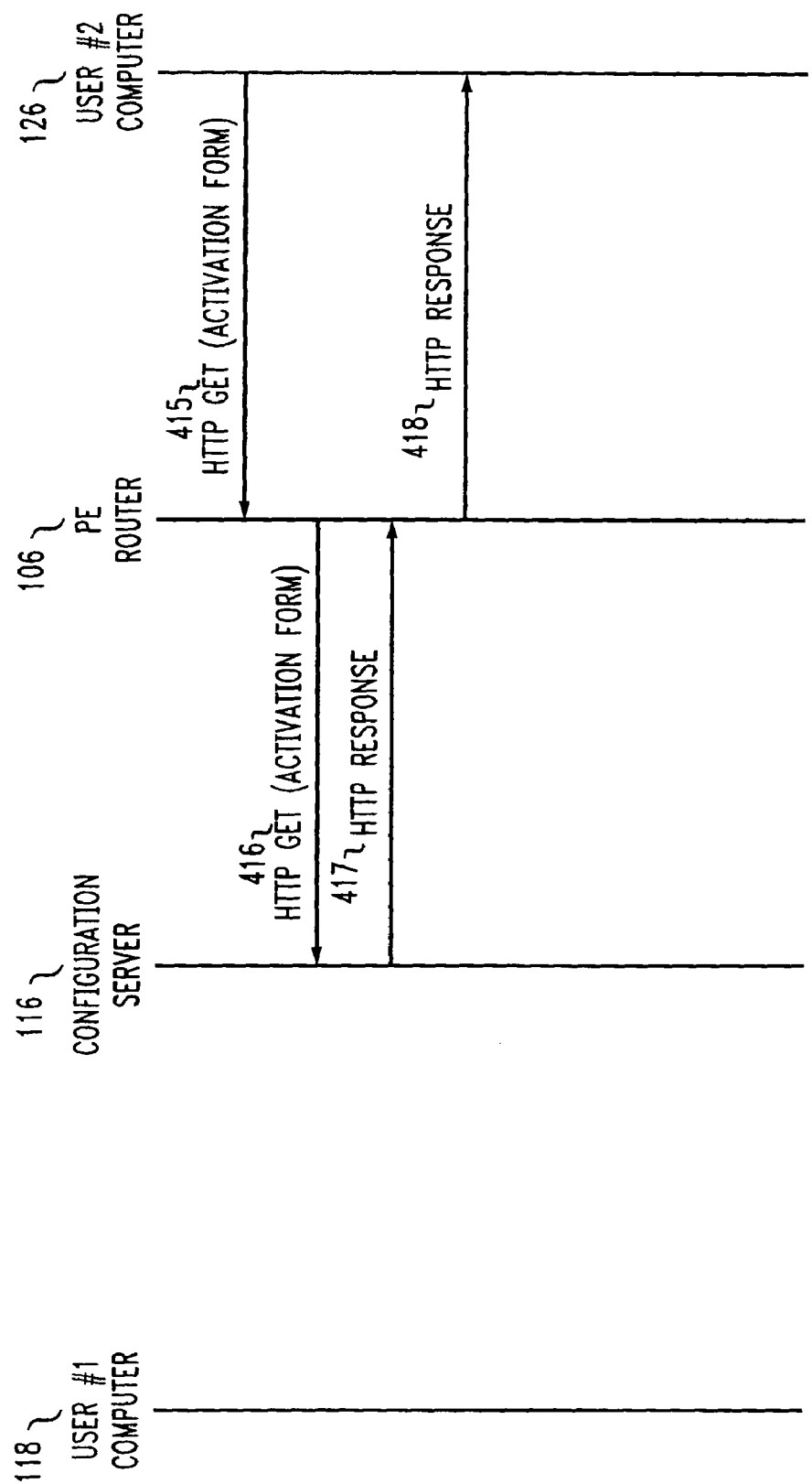

Referring to FIG. 4C, message 415 is an HTTP Get request from User #2 Computer 126 to PE router 106. This request is for a Web page to enter an activation request. The router 106 forwards this HTTP request to the Configuration Server 116 as message 416. Message 417 is the HTTP response message from the Configuration Server 116 to the router 106. The router 106 forwards this HTTP response to the User #2 Computer 126 as message 418.

Figure 4D:
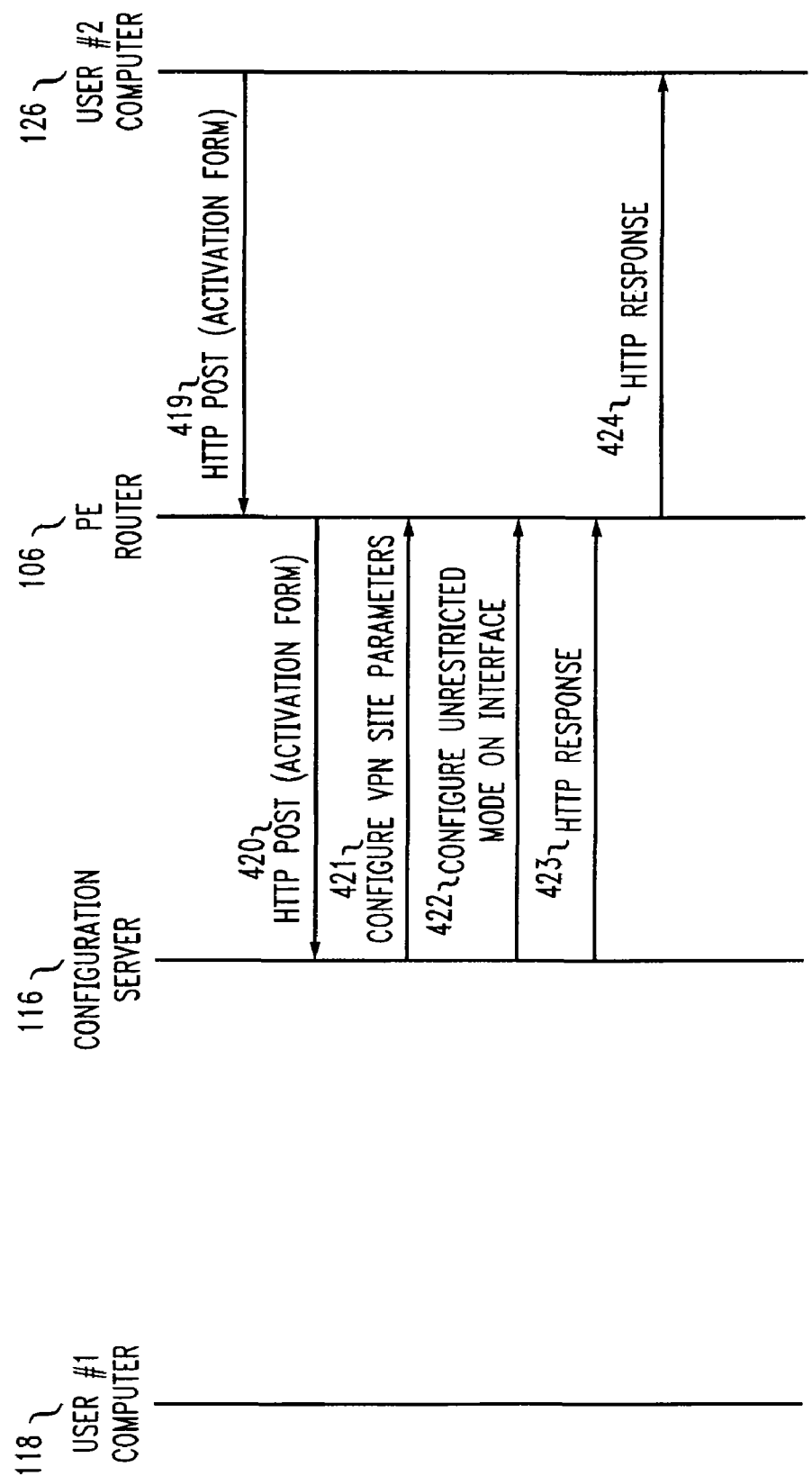

Referring to FIG. 4D, message 419 is an HTTP Post request from User #2 Computer 126 to PE router 106. This request contains the authentication data provided by User #2 Computer 126. The router 106 forwards this request to Configuration Server 116 as message 420. The server 116 processes this request. It transmits VPN site parameters to the router 106 as message 421. It configures interface 124 in unrestricted mode as message 422. Message 423 is the HTTP response to the router 106. The router 106 forwards this HTTP response to User #2 Computer 126 as message 424.

FIG. 5 shows a Web page for submitting an authentication request. The page 502 is presented on User #2 Computer 126 by a Web browser. It contains text field 504 for a user name and text field 506 for a user password. Button 508 is pressed to submit the page.

The current art allows biometric data to be collected and included in the authentication request. Biometric technologies include facial imaging, keystroke analysis, retinal scanning, signature analysis, and speech recognition. Several vendors provide products that can be used to implement biometric solutions. BioLink Technologies, Inc. offers several components for fingerprint authentication. These include a U-Match Mouse, a fingerprint scanning method that is integrated into a two-button mouse, and a U-Match Matchbook, a standalone scanner that captures fingerprint images. An Authenteon Server and Cluster Server Array provide high speed processing of authentication requests against a large database of users. The BioLink Web Software Development Kit (SDK) is a comprehensive tool for integrating biometric solutions into Web applications.

Cyber-SIGN, Inc. also offers a signature recognition system that analyzes the shape, speed, stroke order, off tablet motion, pen pressure, and timing information that are captured during signing. The Cyber-SIGN server uses an inexpensive digitizing tablet to capture signatures for verification. Identix Incorporated offers a face recognition system known as Facelt™ that compensates for lighting conditions, skin color, eyeglasses, facial expressions, facial hair, and aging. A client-server architecture is available. The server maintains a database to allow client access via the Web.

Iridian Technologies, Inc. offers products that use iris recognition technology for authentication. The KnoWho™ Authentication Server enrolls iris codes and performs real-time matching of capture data to stored templates. A Software Development Kit (SDK) is also available. It is to be understood by those skilled in the art that any of the above-described products could be incorporated into the present invention.

FIG. 6 shows a Web page for submitting an activation request. The page 602 is presented on User #2 Computer 126 by a Web browser. It contains text field 604 for a VPN name and text field 606 for a PE router interface address. Button 608 is pressed to submit the page.

FIG. 7 shows an exemplary method for configuring a router interface for restricted mode. The particular format illustrated is that used on routers manufactured by Cisco Systems, Inc. An example of such a router is the Cisco 2621 router. Line 701 specifies the interface. Line 702 is a comment. Line 703 indicates that the interface must operate in restricted mode. The argument to the command is the network address of Configuration Server 116. In restricted mode, an interface processes HTTP requests for the specified Configuration Server. It transmits HTTP responses from that server. However, communication with other destinations is blocked.

Figure 8:
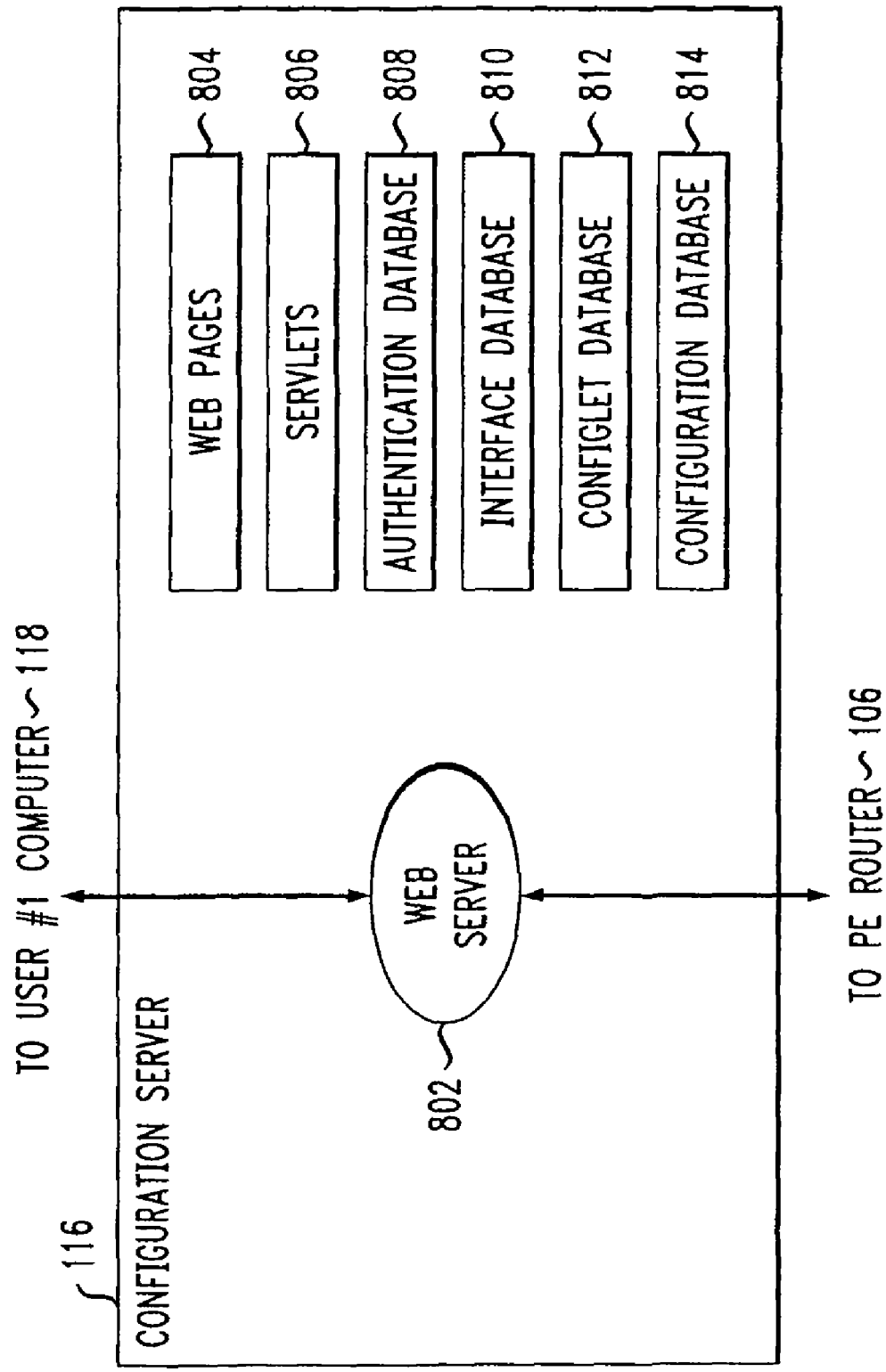
FIG. 8 shows a block diagram of a Configuration Server.

FIG. 8 shows a block diagram of a Configuration Server 116. Web server 802 receives and processes configuration requests from User #1 Computer 118. It also receives and processes authentication and activation requests from PE routers. Web pages 804 allow User #1 120 to configure VPNs and allow User #2 128 to submit authentication and activation requests.

Servlets 806 define the logic that is executed when User #1 120 or User #2 128 submit pages to Web Server 802.

Many vendors offer Web servers and servlet containers. The following table lists some vendors, Web sites, and products.

| Vendor | Product |
| --- | --- |
| Apache Software Foundation | Tomcat |
| BEA Systems, Inc. | WebLogic |
| IBM Corp. | WebSphere |
| Microsoft Corporation | Internet Information Server |
| Oracle Corporation | Application Server |

Web pages and servlets are familiar to those skilled in the current art. There are many Web sites and books that provide information about these technologies.

Authentication Database 808 contains information that is used to authenticate User #1 120 and User #2 128. Database 808 may contain login and password information. It may also contain biometric information. Those skilled in the current art are familiar with the contents of such a database and its organization. Interface Database 810 defines how activation requests received on restricted interfaces of PE routers are processed. Configlet Database 812 contains software that is executed when activation requests are received from restricted interfaces of PE routers. Configuration Database 814 contains all of the configuration data for the elements in a network. Those skilled in the current art are familiar with the contents of such a database and its organization.

FIG. 9 shows the format of the Interface Database 810 on the Configuration Server 116. The database 810 contains one record for each restricted interface of each PE router. Each record contains four fields 902-908. Field 902 is the router loopback address. It identifies one PE router. Field 904 is the router interface. It identifies one interface on the PE router. Field 906 is a list of users. These are the users who are authorized to submit authentication and activation requests on the interface. Field 908 is the name of a configlet. This software is executed if Configuration Server 116 approves an authentication and activation request from one of the users specified in field 906.

The diagram shows three sample records in the table. The first record is for the PE router with loopback address equal to 10.1.1.5 and interface named Ethernet0/1. User John Camiolo is authorized to input configuration requests on this interface. The software file in /configlets/configlet1 is executed to process such requests. The second record is for the PE router with loopback address equal to 10.1.1.5 and interface named Ethernet0/2. User Ed Bonacci is authorized to input configuration requests on this interface. The software file in /configlets/configlet2 is executed to process such requests. The third record is for the PE router with loopback address equal to 10.1.1.5 and interface named Ethernet0/3. Users Jane Smith and Ann Taylor are authorized to input configuration requests on this interface. The software file in /configlets/configlet3 is executed to process such requests.

Figure 10A:
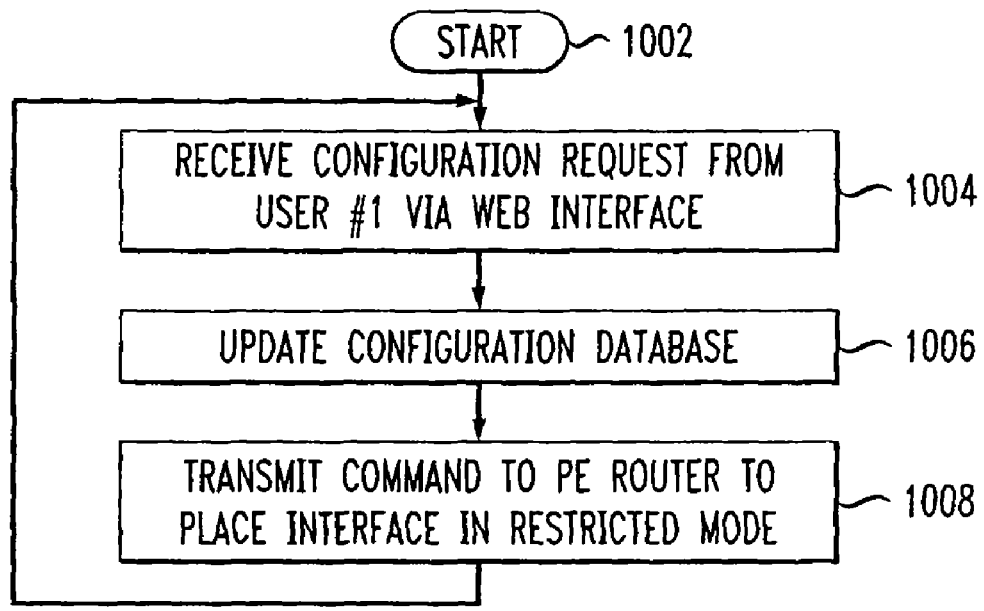
FIG. 10A-10C show flowcharts for the Configuration Server.
Figure 10B:
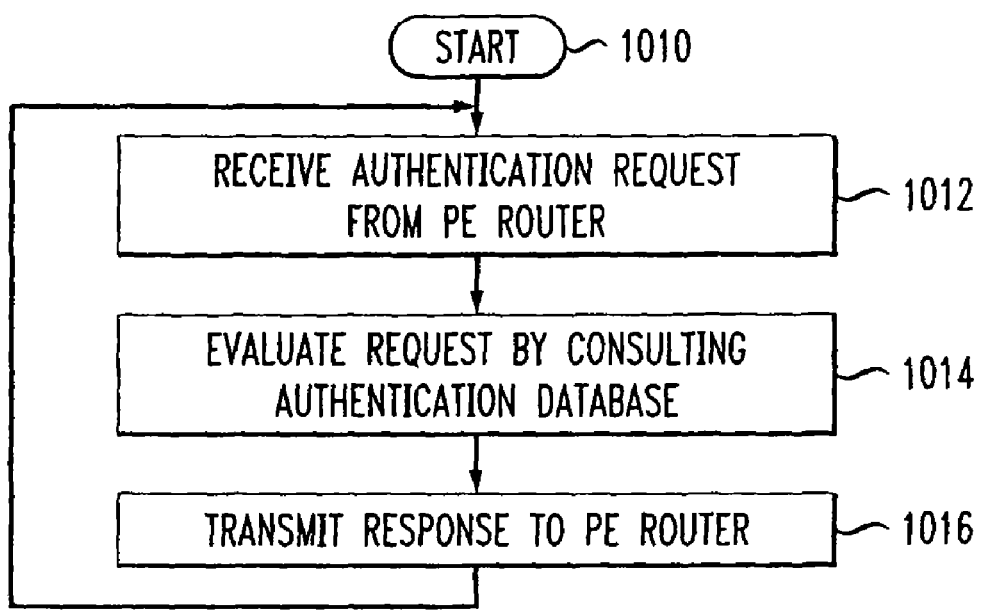
Figure 10C:
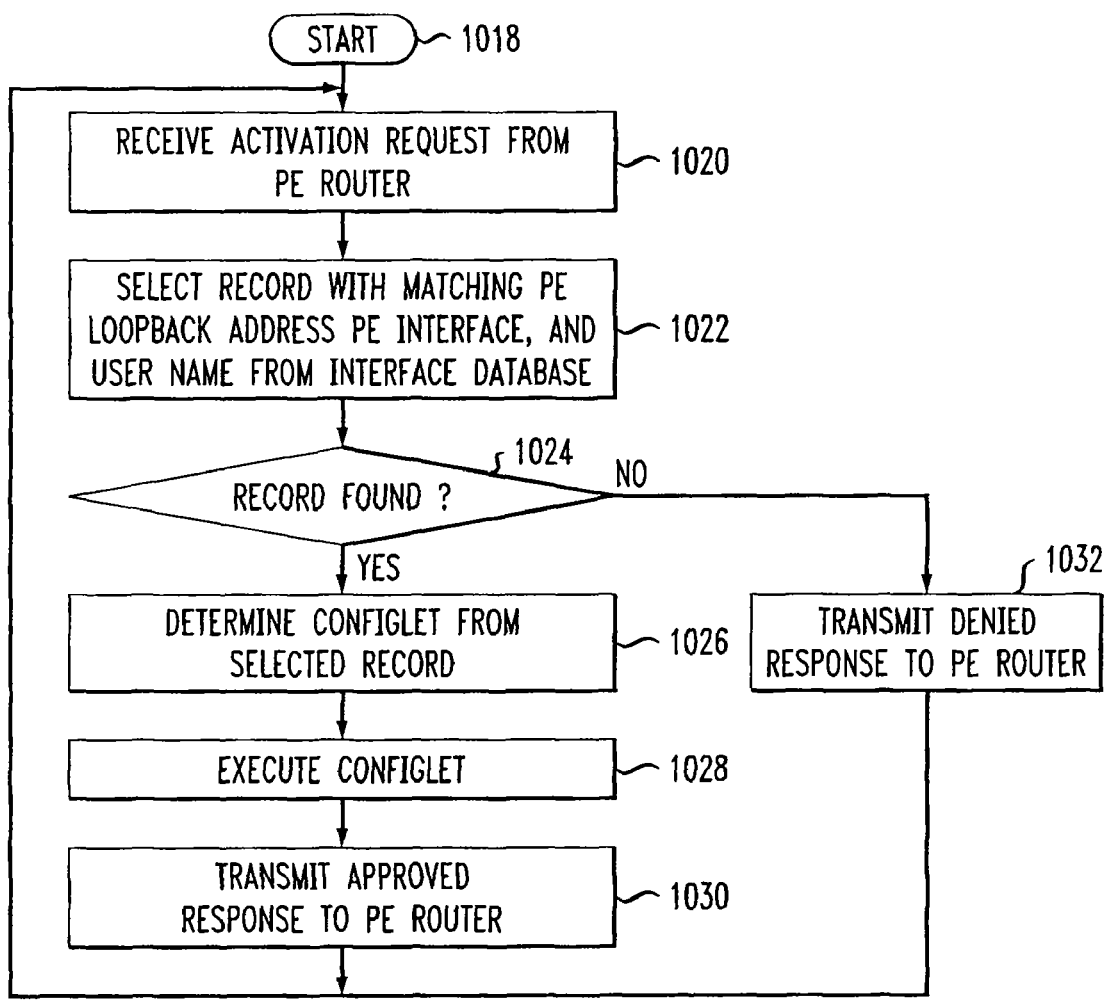

FIG. 10A-10C show flowcharts depicting processes performed by the Configuration Server 116. The exemplary software is organized as three threads of execution.

FIG. 10A is the thread that receives and processes configuration requests from User #1. Execution starts at step 1002. The request is received at step 1004. Configuration Database 814 is updated at step 1006. A command is transmitted to PE router 106 to place interface 124 in restricted mode at step 1008. Execution continues at step 1004.

FIG. 10B is the thread that receives and processes authentication requests from User #2. Execution starts at step 1010. The request is received from PE router 106 at step 1012. Authentication Database 808 is consulted at step 1014. A response is transmitted to PE router 106 at step 1016. This response indicates if the request is approved or denied. Execution continues at step 1012.

FIG. 10C is the thread that receives and processes activation requests from User #2. Execution starts at step 1018. The request is received from PE router 106 at step 1020. Interface Database 810 is consulted at step 1022. A record with a matching loopback address, access interface, and user name is selected. A check is done at step 1024 to determine if a record was selected. If yes, a configlet is determined from the selected record at step 1026. The configlet is executed at step 1028. An approved response is transmitted to the router at step 1030. Otherwise, a denied response is transmitted to the router at step 1032. Execution continues at step 1020.

Figure 11:
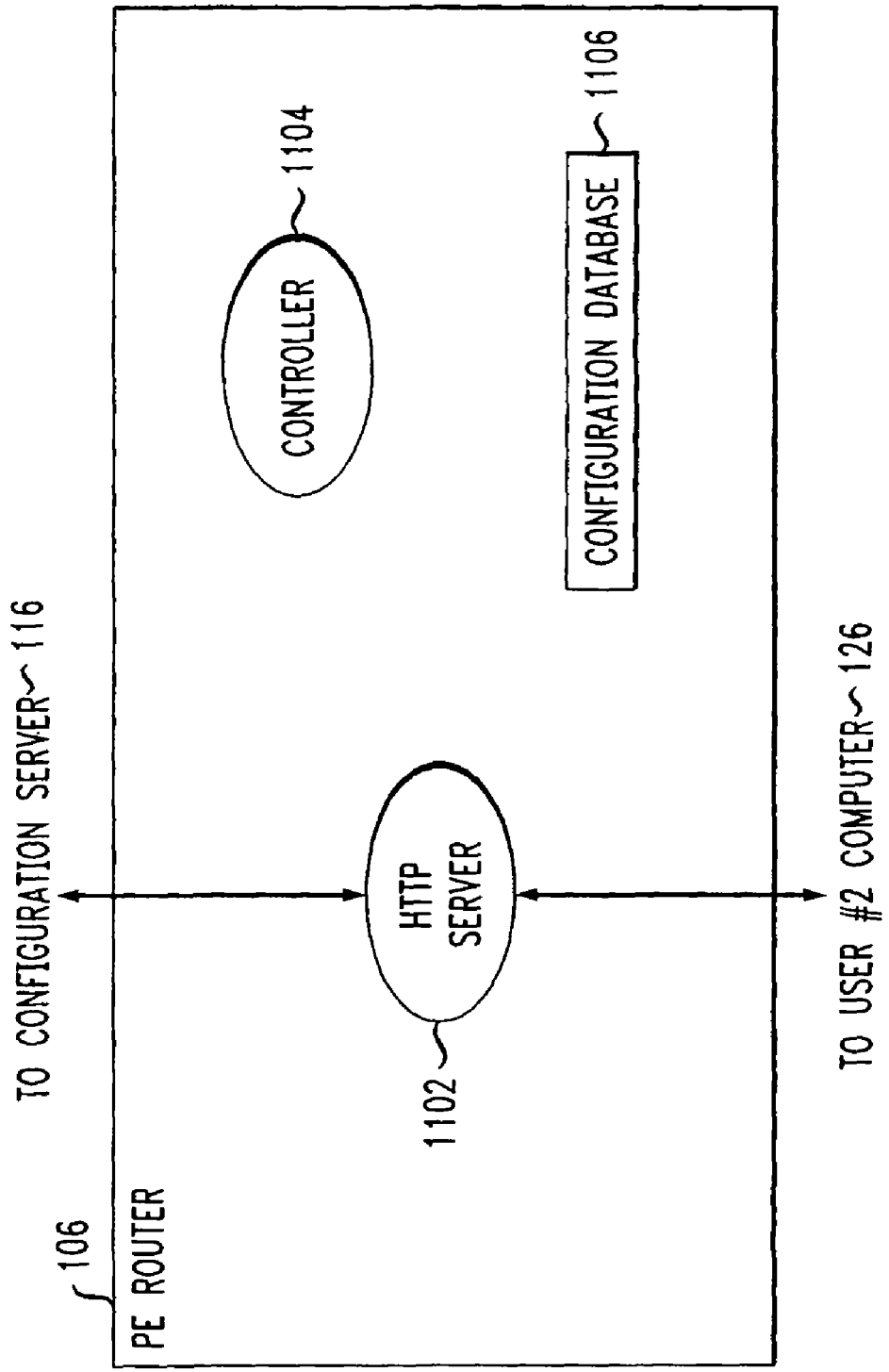
FIG. 11 shows a block diagram of a PE router.

FIG. 11 shows a block diagram of PE router 106. Router 106 contains an HTTP server 1102. This server communicates with User #2 Computer 126 and Configuration Server 116. Controller 1104 manages the overall execution of router 106. The functionality and organization of this software is well known to those familiar with the current art. Configuration Database 1106 stores the information that is needed to specify the correct operation of router 106. The contents and format of this database is well known to those familiar with the current art.

Figure 12A:
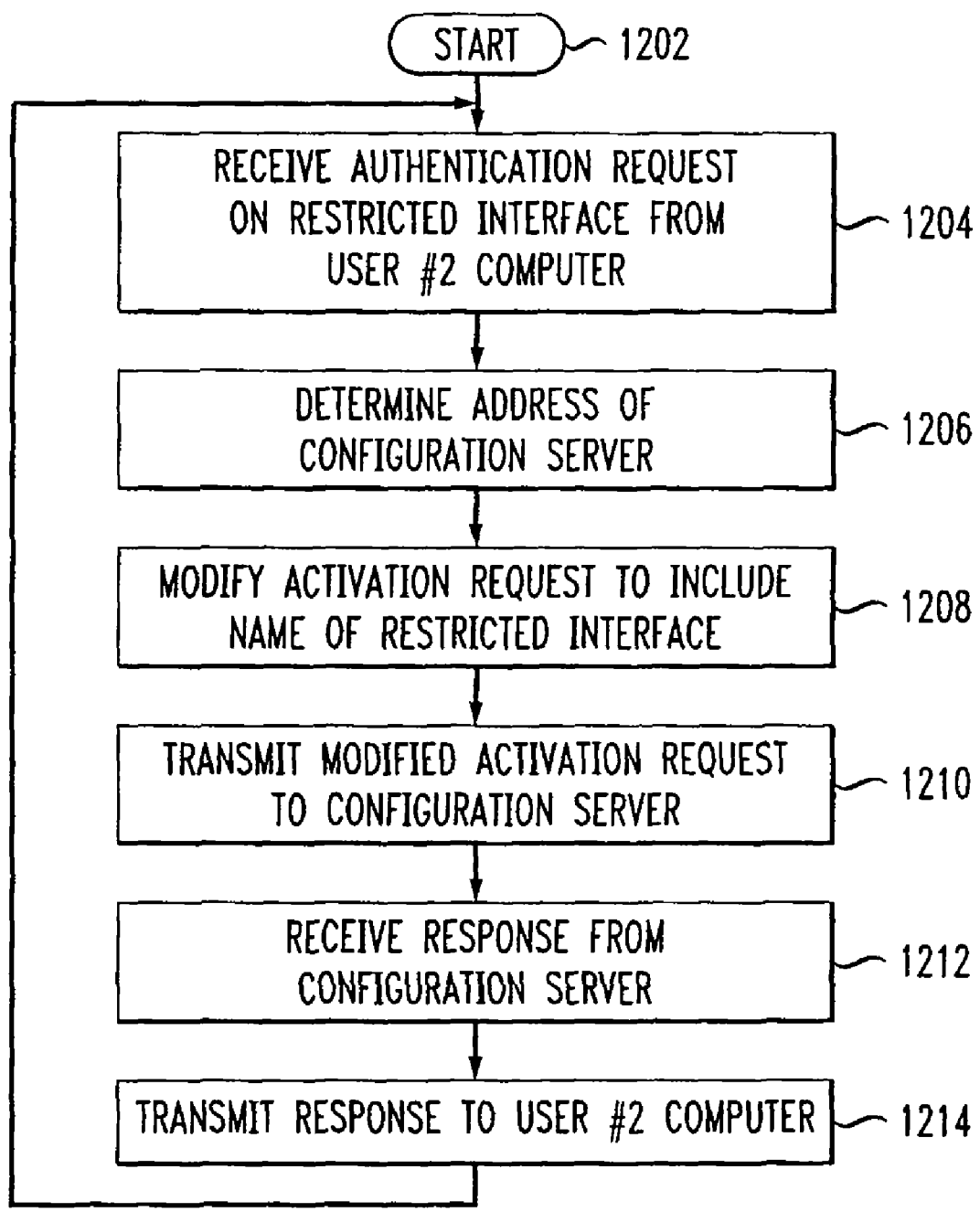
FIG. 12A-12B show flowcharts for a PE router.
Figure 12B:
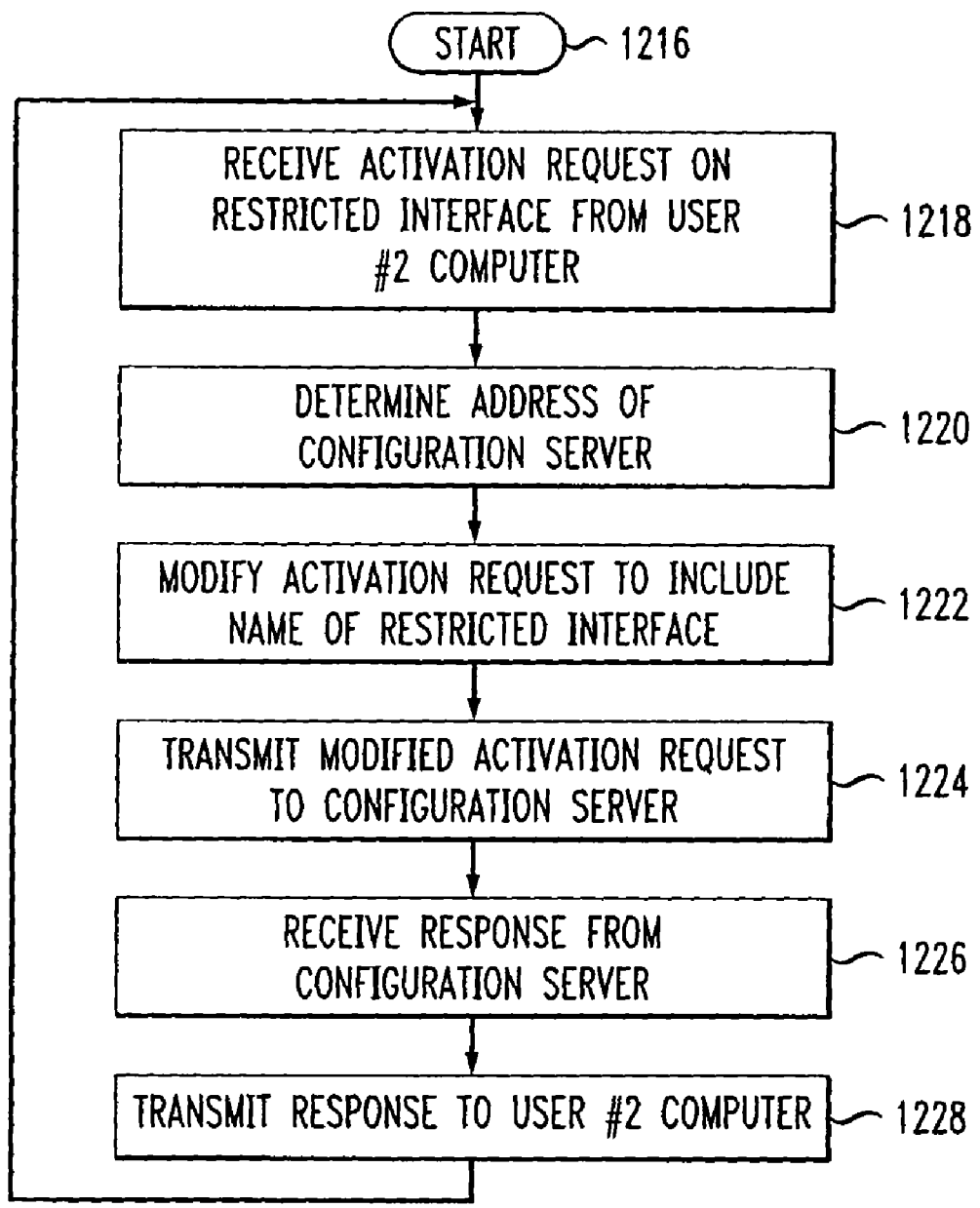

FIG. 12A-12B show flowcharts for a PE router. The flowcharts illustrate how authentication and activation requests from User #2 Computer 126 are received and processed. Separate threads handle the processing of these two types of requests.

FIG. 12A illustrates the thread that receives and processes authentication requests. Execution begins at step 1202. An authentication request is received on a restricted interface of PE router 106 from User #2 Computer 126 at step 1204. The network address of Configuration Server 116 is determined at step 1206. This is obtained from the argument to the restricted command applied to the interface. (See line 703 in FIG. 7.) The request is modified to include the name of the restricted interface at step 1208. The request is transmitted to Configuration Server 116 at step 1210. The response is received from the server 116 at step 1212 and transmitted to User #2 Computer 126 at step 1214. Execution continues at step 1204.

FIG. 12B illustrates the thread that receives and processes activation requests. Execution begins at step 1216. An activation request is received on a restricted interface of PE router 106 from User #2 Computer 126 at step 1218. The network address of Configuration Server 116 is determined at step 1220. This is obtained from the argument to the restricted command applied to the interface. (See line 703 in FIG. 7.) The request is modified to include the name of the restricted interface at step 1222. The request is transmitted to Configuration Server 116 at step 1224. The response is received from the server 116 at step 1226 and transmitted to User #2 Computer 126 at step 1228. Execution continues at step 1218.

Multi-VRF CE Virtual Private Networks

The current art provides a technique to configure multiple VPNs in a multi-tenant building. The building connects to a backbone network by using one physical channel that is shared by all VPNs in the building. This approach significantly reduces the cost to connect the building to the backbone network.

The wide area network (WAN) connection between the CE router and PE router is configured into multiple subinterfaces. Each subinterface supports one logical channel for one VPN site in the building. The local area network (LAN) interface is also configured into multiple subinterfaces. Each subinterface supports one logical channel for one VPN site in the building. Multi-Protocol Label Switching (MPLS) technology is used within the CE router to connect the WAN and LAN subinterfaces. This technique is known as Multi-VPN Routing and Forwarding (VRF) CE virtual private networks.

The present invention can be used to avoid serious provisioning errors in these configurations. FIG. 13 shows a system architecture for a Multi-VRF CE. A Multi-Tenant Building 1302 contains a customer edge (CE) router 1304. The router 1304 connects to VPN sites 1306-1314 in the building User #2 128 connects User #2 Computer 126 to VPN Site 1310. The site 1310 connects to CE router 1304 on interface 1316. Configuration Server 116 configures PE router 106 and CE router 1304. Specifically, VRF tables must be defined on both of these elements to obtain the desired connectivity.

Figure 14A:
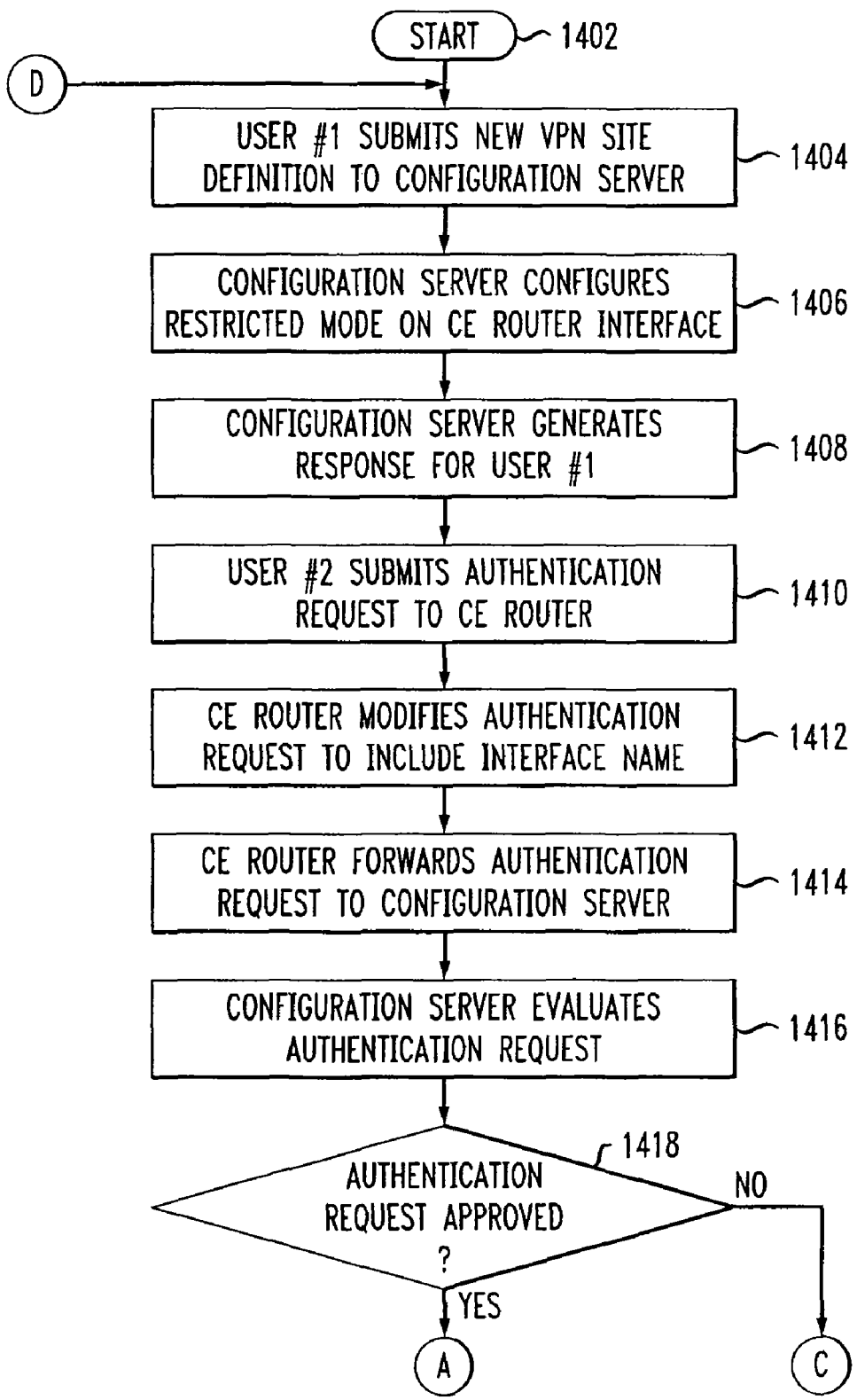
FIG. 14A-14C show flowcharts for the system.
Figure 14B:
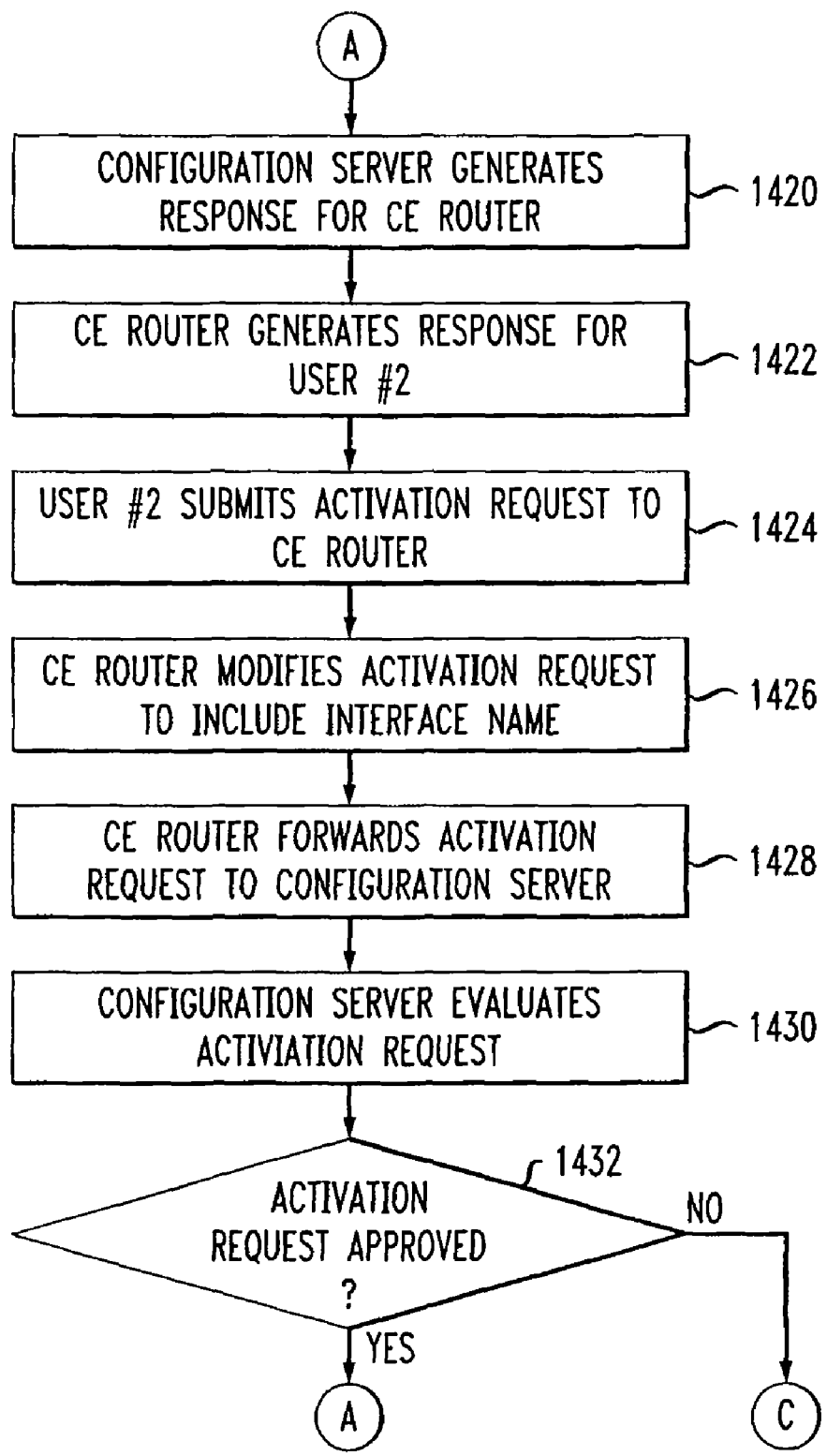
Figure 14C:
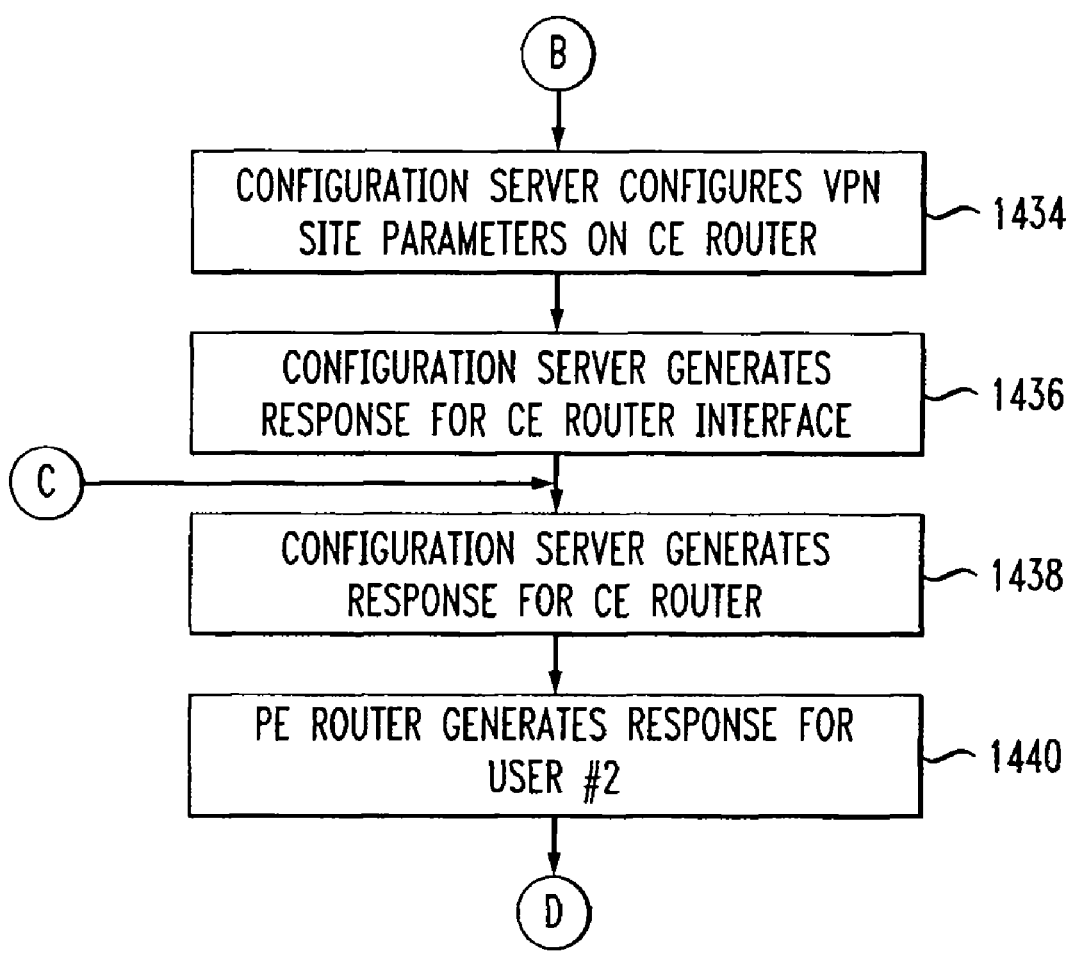

FIG. 14A-14C show a flowchart for the system. These flowcharts are very similar to those presented in FIG. 3A-3C. The difference is that the LAN subinterfaces of CE router 1304 are restricted. User #2 128 must connect User #2 Computer 126 to a VPN site. The user must then transmit authentication and activation requests to a LAN subinterface of CE router 1304. Configuration Server 116 evaluates these requests. If the requests are approved, it configures the CE router 1304 to connect the subinterface to a VPN and places the subinterface in unrestricted mode.

Referring to FIG. 14A-14C, execution starts at step 1402. User #1 120 submits a new VPN site definition request to Configuration Server 116 at step 1404. The Configuration Server 116 configures interface 1316 on CE router 1304 in restricted mode at step 1406. The Configuration Server 116 generates a response for User #1 120 at step 1408. The response indicates that the submission was successfully processed.

User #2 128 submits an authentication request to the interface 1316 of CE router 1304 at step 1410. The CE router 1304 modifies this request to include the name of interface 1316 at step 1412. The request is forwarded to Configuration Server 116 at step 1414. The server 116 evaluates the request at step 1416. Specifically, the server 116 determines if User #2 128 is one of the individuals who is authorized to submit requests on CE router interface 1316 at step 1418. If no, the server 116 responds to CE router 1304 with an error message at step 1438. The router 1304 generates a response for User #2 128 at step 1440. Execution continues at step 1404. If yes, the server 116 generates a response for the router 1304 at step 1420. The router 1304 forwards the response to User #2 128 at step 1422.

User #2 128 submits an activation request to interface 1316 of CE router 1304 at step 1424. The router 1304 modifies this request to include the name of interface 1316 at step 1426. The request is forwarded to Configuration Server 116 at step 1428. The server 116 evaluates the request at step 1430. Specifically, the server 116 determines if User #2 128 is one of the individuals who is authorized to submit requests on CE router interface 1316 at step 1432. If no, the server 116 responds to CE router 1304 with an error message at step 1438. The router 1304 generates a response for User #2 128 at step 1440. Execution continues at step 1404. If yes, the server 116 configures the VPN site parameters on the router 1304 at step 1434. The server 116 configures unrestricted mode on interface 1316 of CE router 1304 at step 1436. The server 116 generates a response for the router 1304 at step 1438. The router 1304 forwards the response to User #2 128 at step 1440. Execution continues at step 1404.

FIG. 15A-15D show a message sequence diagram for the system. These flowcharts are very similar to those presented in FIG. 4A-4D. One difference is that Configuration Server 116 communicates with CE router 1304 and places a LAN subinterface in restricted mode. Another difference is that User #2 Computer 126 transmits authentication and activation requests to CE router 1304 via subinterface 1316. The router forwards these requests to Configuration Server 116. The server 116 evaluates these requests. If the requests are approved it configures the CE router 1304 to connect the subinterface to a VPN and places the subinterface 1316 in unrestricted mode.

Referring to FIGS. 15A-15D, a sequence of HTTP requests and responses is typically exchanged between Configuration Server 116 and User #1 Computer 118 to configure VPN parameters. FIGS. 15A-15D show only one exchange for simplicity.

Figure 15A:
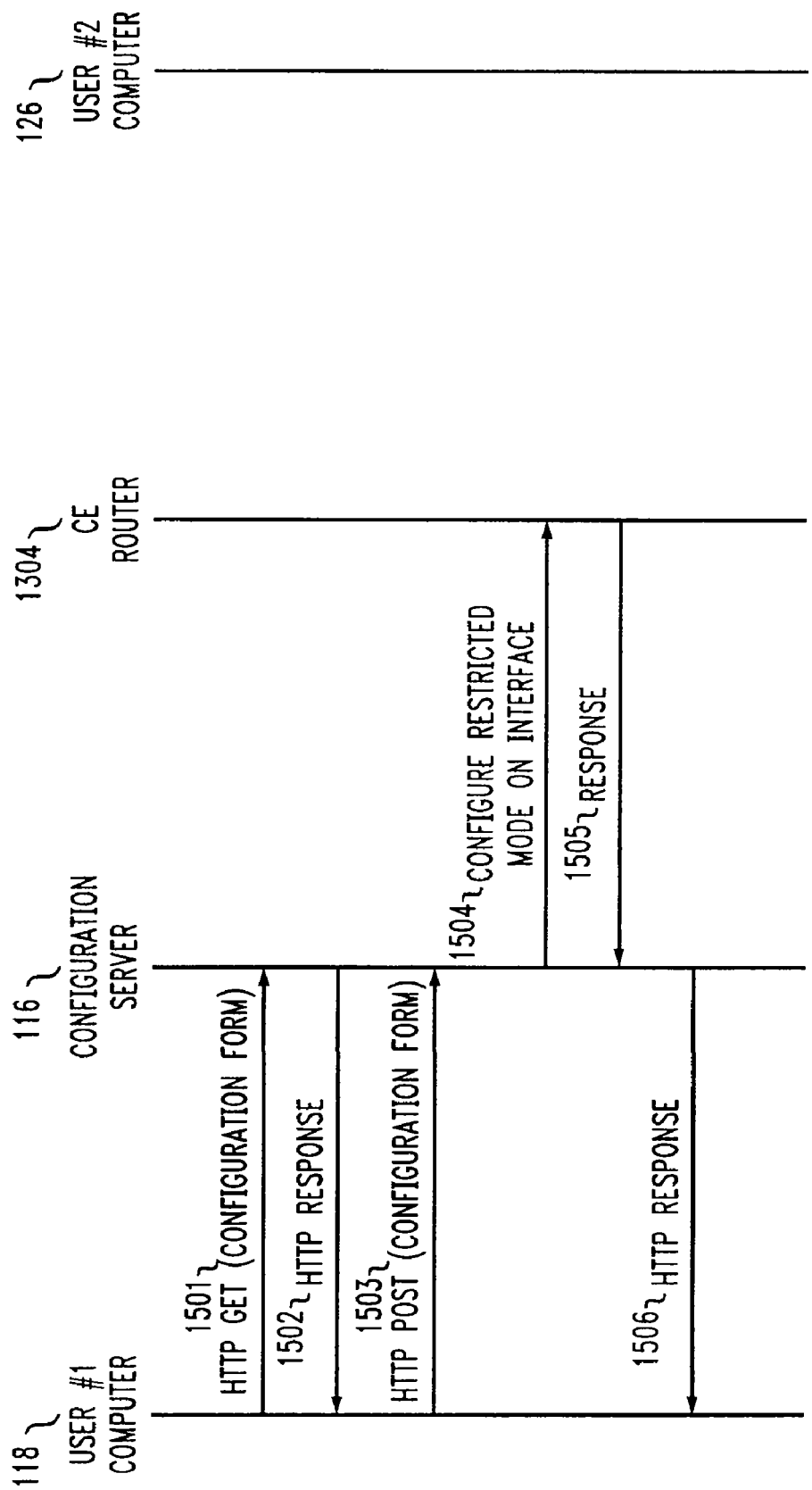

Referring to FIG. 15A, message 1501 is an HTTP Get request from User #1 Computer 118 to Configuration Server 116. This request is for a Web page to enter configuration data for a VPN site. Message 1502 is the HTTP response to this request. Message 1503 is an HTTP Post request from User #1 120 to Configuration Server 116. This request contains the configuration data for a VPN site. Configuration Server 116 evaluates this configuration request. It stores the VPN site parameters in a local database (not shown) and then transmits message 1504 to CE router 1304. Message 1504 configures interface 1316 on CE router 1304 in restricted mode. Message 1505 is the response from the router 1304 to the server 116. Message 1506 is the HTTP response to the HTTP Post in message 1503.

Referring to FIG. 15B, message 1507 is an HTTP Get request from User #2 Computer 126 to CE router 1304. This request is for a Web page to enter authentication data for User #2 128. The router 1304 forwards this request to Configuration Server 116 as message 1508. Message 1509 is the HTTP response to the router 1304. The router 1304 forwards this HTTP response to User #2 Computer 126 as message 1510.

Message 1511 is an HTTP Post request from User #2 Computer 126 to CE router 1304. This request contains the authentication data provided by User #2 128. This data can include a login and password. It may also include biometric information (e.g. fingerprint, retinal, speech, handwriting). The router 1304 forwards this HTTP request to Configuration Server 116 as message 1512. Message 1513 is the HTTP response to the router 1304. The router 1304 forwards this HTTP response to User #2 Computer 126 as message 1514.

Figure 15C:
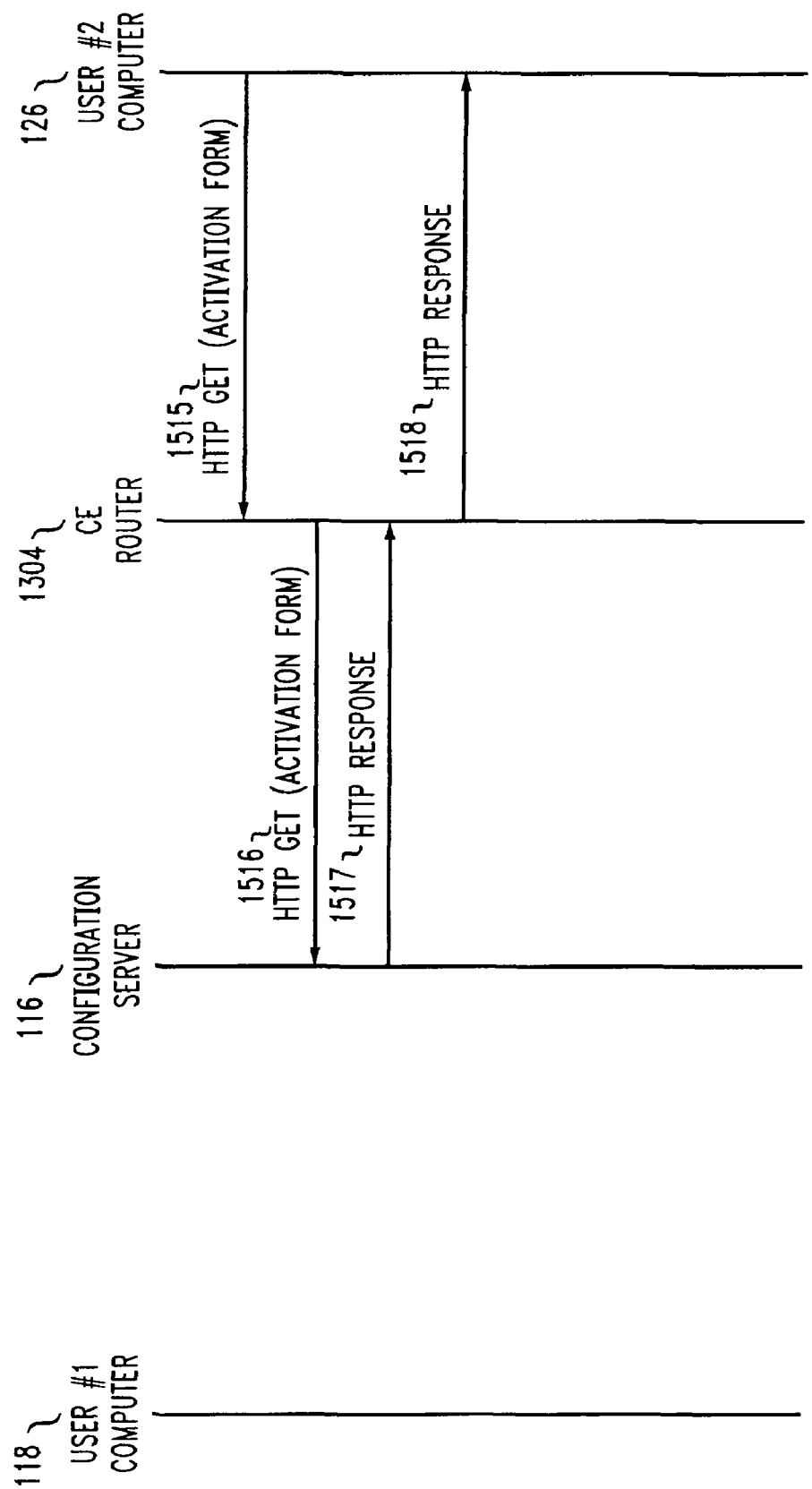

Referring to FIG. 15C, message 1515 is an HTTP Get request from User #2 Computer 126 to CE router 1304. This request is for a Web page to enter an activation request. The router 1304 forwards this HTTP request to the Configuration Server 116 as message 1516. Message 1517 is the HTTP response message from the Configuration Server 116 to the router 1304. The router 1304 forwards this HTTP response to the User #2 Computer 126 as message 1518.

Referring to FIG. 15D, message 1519 is an HTTP Post request from User #2 Computer 126 to PE router 1304. This request contains the activation data provided by User #2 Computer 126. The router 1304 forwards this request to Configuration Server 116 as message 1520. The server 116 processes this request. It transmits VPN site parameters to the router 1304 as message 1521. It configures interface 1316 in unrestricted mode as message 1522. Message 1523 is the HTTP response to the router 1304. The router 1304 forwards this HTTP response to User #2 Computer 126 as message 1524.

IPSEC Virtual Private Networks

The current art provides another technique for implementing VPNs. The IP Security (IPSEC) protocols can be used to provide secure communication among a collection of VPN sites. Many vendors offer IPSEC VPN products. The following table lists some vendors, Web sites, and products.

| Vendor | Product |
| --- | --- |
| Avaya Inc. | VPN Service Unit Gateway |
| Checkpoint Software Technologies, Ltd. | VPN-1 SecuRemote, VPN-1 Secure Client |
| Cisco Systems, Inc. | Cisco 7100, 7200, 7400, 7600 series VPN routers |
| IBM Corp. | AS/400 VPN Server |
| Microsoft Corporation | Windows |
| Nortel Networks Ltd. | Contivity Gateway |

It is a complex task to configure the CE devices at each VPN site. Therefore, VPN customers may select a service provider to configure these elements. The present invention can be used to reduce serious provisioning errors in this environment.

FIG. 16 shows the system architecture for an IPSEC VPN. VPN Site 1602 contains CE router 1604 that connects to backbone network 102. User #2 128 connects User #2 Computer 126 to VPN Site 1602. This computer transmits authentication and activation requests to CE router 1604. The input interface to that router is initially in restricted mode.

The router forwards the requests to Configuration Server 116. If the requests are approved it configures the router with the IPSEC parameters for a VPN and places the interface in unrestricted mode.

Firewalls

The current art provides firewalls that protect networks from security attacks by computer hackers. It is a complex task to configure firewalls. Therefore, customers may select a service provider to configure these elements. The present invention can be used to reduce serious provisioning errors in this environment.

The present invention requires enhancements to network elements (e.g. routers, gateways, firewalls) in the current art. It must be possible to configure an interface in restricted or unrestricted mode. If an interface in restricted mode receives an authentication or activation request, these requests must be modified to include the identity of the interface. The modified request must then be forwarded to a Configuration Server.

Responses from a Configuration Server must be forwarded to the network element that originated the request.

The present invention requires enhancements to Configuration Servers in the current art. It must be possible to configure an Interface Database on the server. This database contains one record for each restricted interface on each network element. Each record contains the identity of the network element, the identity of the restricted interface, a list of users authorized to transmit authentication and activation requests to that interface, and a reference to software that is to execute after authentication and activation requests are approved.

A Configuration Server must also be enhanced to receive and process authentication and activation requests from network elements. The information in the Interface Database is used during this processing.

While the invention has been described with reference to specific embodiments, variations of the invention may be constructed without departing from the scope of the invention that is defined in the following claims.

While the foregoing is directed to embodiments of the present invention, other and further embodiments of the invention may be devised without departing from the basic scope thereof, and the scope thereof is determined by the claims that follow.

The invention claimed is:

1. A method of configuring a network element such that a virtual private network site is able to connect to the network element, the method comprising:
    configuring an interface on a provider edge router in a restricted mode;
    receiving a request from the interface to authenticate a user associated with a virtual private network requesting to connect to the interface;
    determining if the user is authorized to submit the request to the interface;
    if the user is authorized, receiving an activation request from the interface to allow the virtual private network to connect to the interface;
    determining if the user is authorized to connect to the interface via the virtual private network; and
    if the request from the interface to authenticate and the activation request are approved, configuring a virtual private network site parameter at the provider edge router and configuring the interface on the provider edge router in an unrestricted mode.

2. The method of claim 1, wherein the provider edge router comprises multiple interfaces, where each interface is connected to a different virtual private network.

3. The method of claim 1, wherein the request from the interface to authenticate comprises a login and a password.

4. The method of claim 1, wherein the request from the interface to authenticate comprises biometric information.

5. The method of claim 4, wherein the biometric information comprises fingerprint information.

6. The method of claim 4, wherein the biometric information comprises facial imaging information.

7. The method of claim 4, wherein the biometric information comprises keystroke analysis information.

8. The method of claim 4, wherein the biometric information comprises retinal scanning information.

9. The method of claim 4, wherein the biometric information comprises signature analysis information.

10. The method of claim 4, wherein the biometric information comprises speech recognition information.

11. The method of claim 1, wherein the virtual private network is a border gateway protocol/multiprotocol label switching virtual private network.

12. The method of claim 1, wherein the virtual private network is a multi-virtual private network routing and forwarding customer edge virtual private network.

13. The method of claim 1, wherein the virtual private network is an internet protocol security virtual private network.

14. The method of claim 1, wherein the virtual private network is a firewall.

15. A method for configuring a network element that is in a restricted mode to an unrestricted mode and connecting an interface of the network element to a virtual private network, comprising:
    receiving authentication data from the virtual private network and a request to connect to the interface of the network element;
    modifying the authentication data to include an interface name, the interface name corresponding to the interface to which the virtual private network is requesting connection;
    forwarding the authentication data that is modified to a configuration server;
    receiving a response from the configuration server as to an authentication of the virtual private network;
    if the virtual private network is authenticated, receiving an activation request from the virtual private network; and
    forwarding the activation request to the configuration server, the activation request comprising the interface name, wherein if the configuration server approves the activation request, the network element is configured in the unrestricted mode for allowing the virtual private network to connect to the interface.

16. The method of claim 15, wherein the network element is a provider edge router.

17. The method of claim 15, wherein the network element is a customer edge router.

18. The method of claim 15, wherein the authentication data comprises a login and a password.

19. The method of claim 15, wherein the authentication data comprises biometric information.

20. The method of claim 19, wherein the biometric information comprises fingerprint information.

21. The method of claim 19, wherein the biometric information comprises facial imaging information.

22. The method of claim 19, wherein the biometric information comprises keystroke analysis information.

23. The method of claim 19, wherein the biometric information comprises retinal scanning information.

24. The method of claim 19, wherein the biometric information comprises signature analysis information.

25. The method of claim 19, wherein the biometric information comprises speech recognition information.

26. The method of claim 15, wherein the virtual private network is a border gateway protocol/multiprotocol label switching virtual private network.

27. The method of claim 15, wherein the virtual private network is a multi-virtual private network routing and forwarding customer edge virtual private network.

28. The method of claim 15, wherein the virtual private network is an Internet protocol security virtual private network.

29. The method of claim 15, wherein the virtual private network is a firewall.

* * * * *